US009169381B2

(12) United States Patent
Tielemans et al.

(10) Patent No.: US 9,169,381 B2
(45) Date of Patent: Oct. 27, 2015

(54) RADIATION CURABLE AQUEOUS COMPOSITIONS

(75) Inventors: Michel Tielemans, Wemmel (BE); Jean-Noël Baurant, Dilbeek (BE)

(73) Assignee: Allnex Belgium S.A., Brussels (BE)

( * ) Notice: Subject to any disclaimer, the term of this patent is extended or adjusted under 35 U.S.C. 154(b) by 0 days.

(21) Appl. No.: 13/811,736

(22) PCT Filed: Jul. 12, 2011

(86) PCT No.: PCT/EP2011/061827
§ 371 (c)(1),
(2), (4) Date: Jan. 23, 2013

(87) PCT Pub. No.: WO2012/013488
PCT Pub. Date: Feb. 2, 2012

(65) Prior Publication Data
US 2013/0122310 A1 May 16, 2013

(30) Foreign Application Priority Data

Jul. 27, 2010 (EP) .................................... 10170858

(51) Int. Cl.
  *C08L 33/14* (2006.01)
  *C08G 18/62* (2006.01)
  *C08G 18/67* (2006.01)
  *C08G 18/70* (2006.01)
  *C08G 18/73* (2006.01)
  *C09D 175/16* (2006.01)

(52) U.S. Cl.
  CPC ............. *C08L 33/14* (2013.01); *C08G 18/6254* (2013.01); *C08G 18/673* (2013.01); *C08G 18/706* (2013.01); *C08G 18/73* (2013.01); *C09D 175/16* (2013.01); *Y10T 428/31551* (2015.04)

(58) Field of Classification Search
  CPC .. C08G 18/6254; C08G 18/673; C08G 18/73; C08G 18/706; C09D 175/16; C08L 33/14; Y10T 428/31551; B05D 2502/00; B05D 2502/005; B05D 2503/00; B05D 2202/00
  USPC .................. 428/423.1; 524/558; 427/506
  See application file for complete search history.

(56) References Cited

U.S. PATENT DOCUMENTS

| 3,775,377 | A | 11/1973 | Kokawa | |
| 5,567,761 | A * | 10/1996 | Song | ............... 524/523 |
| 6,872,760 | B2 * | 3/2005 | Hu et al. | ............... 522/96 |
| 6,946,515 | B1 * | 9/2005 | Lettmann et al. | ............. 524/591 |
| 2006/0257651 | A1 * | 11/2006 | Shintani | ................. 428/355 AC |
| 2007/0082192 | A1 | 4/2007 | Kondo | |

FOREIGN PATENT DOCUMENTS

| DE | 2239411 | 2/1973 |
| JP | 60-204319 | 10/1985 |
| JP | 2004-010779 | 1/2004 |
| JP | 2008-189706 | 8/2008 |

OTHER PUBLICATIONS

International Search Report issued Oct. 7, 2011 in International (PCT) Application No. PCT/EP2011/061827.

* cited by examiner

*Primary Examiner* — Thao T Tran
(74) *Attorney, Agent, or Firm* — Wenderoth, Lind & Ponack, L.L.P.

(57) ABSTRACT

The present invention relates to a radiation curable aqueous composition comprising at least one ethylenically unsaturated polymer (1) which is the reaction product of—a water-dispersible (meth)acrylic polymer A containing pendant hydroxyl or isocyanate groups, and containing pendant groups capable to render the polymer dispersible in aqueous medium either directly or after reaction with a neutralizing agent; —at least one ethylenically unsaturated compound B which can be radically polymerized under irradiation and which attaches to the (meth)acrylic polymer A by an urethane linkage; —and, optionally, at least one neutralizing agent C. The present invention further relates to the making and use of such radiation curable aqueous compositions.

13 Claims, No Drawings

RADIATION CURABLE AQUEOUS COMPOSITIONS

The present invention relates to radiation curable aqueous compositions comprising a water-dispersible ethylenically unsaturated (meth)acrylic polymer, to their preparation and use. Acrylic polymers have been used as the main backbone for the development of radiation curable polymer dispersions with peculiar properties. The acrylic polymer is often preferred when coatings need to be produced with good optical properties, good adhesion or superior outdoor resistance. Blends of acrylic polymer dispersions obtained by emulsion polymerization with polyacrylated molecules like trimethylolpropane triacrylate and the like have been used for a long time for instance for specific applications like imaging and printing plates. However, the polymer does not contain the ethylenically unsaturated functionality and does not consequently participate to the crosslinking network after radiation curing, resulting in a pronounced reduction of the chemical and mechanical resistance properties as well as additional safety, health and environmental concerns.

To provide the best performance, it is more desirable to covalently attach ethylenically unsaturated functionalities directly to the acrylic polymer. For that purpose, several homogeneous (in bulk or in solvent) or heterogeneous (in water) grafting chemistries have been proposed including for instance the reaction between carboxylic acid and epoxy, between hydroxyl and N-methylol, between anhydride and hydroxyl or between carboxylic acid and hydroxyl. The resulting polymer dispersion is usually stabilized by the anionic charges present on the polymer backbone and/or by the use of an appropriate emulsifier.

There is a continued demand for acrylic polymer dispersions with improved chemical and/or mechanical resistance.

Against this background, there is now provided a radiation curable aqueous composition comprising at least one ethylenically unsaturated polymer (1) which is the reaction product of

- a water-dispersible (meth)acrylic polymer A containing pendant hydroxyl groups or pendant isocyanate groups, and containing pendant groups capable to render the polymer dispersible in aqueous medium either directly or after reaction with a neutralizing agent;
- at least one ethylenically unsaturated compound B which can be radically polymerized under irradiation, and which attaches to the (meth)acrylic polymer A by an urethane linkage;
- and, optionally, at least one neutralizing agent C, wherein the ethylenically unsaturated polymer (1) optionally has residual hydroxyl functionality. Compounds B typically are selected from polyethylenically unsaturated compounds, used alone or in combination with one or more monoethylenically unsaturated compounds. Most preferably compounds B are polyethylenically unsaturated compounds.

By a polyethylenically unsaturated compound is meant to designate in the invention a compound that contains at least 2 ethylenically unsaturated functions. The at least 2 unsaturated functions can be selected from (meth)acrylic groups and/or allylic groups. (Meth)acrylic groups are preferred. By (meth)acrylic is meant to designate acrylic groups and/or methacrylic groups. Acrylic groups are most preferred.

By water-dispersible is meant to designate in the present invention a polymer that, when mixed with water, forms a polyphasic system of small particles dispersed in water. The pendant groups that render the polymer dispersible in aqueous medium can be of ionic or non-ionic nature. Preferably they are of ionic nature and most preferably they are acidic groups or the salts thereof. Examples of suitable acid groups include carboxylic acid, sulfonic acid, and/or phoshonic acid. Suitable salts are carboxylates, sulfonates and/or phosphonates. Examples of suitable cations are ammonium, trimethylammonium, triethylammonium, sodium, potassium, lithium and the like. Nonionic stabilization is often provided by hydrophilic moieties including polyethyleneoxide, polypropyleneoxide or block copolymers made therefrom.

The water-dispersible (meth)acrylic polymer A used in the invention preferably has a glass transition temperature (Tg) comprised between −50° C. and +100° C. Preferably the Tg of this polymer A is at least 0° C., more preferably at least 10° C. Preferably the Tg of this polymer A is at most 70° C., more preferably at most 50° C.

The water-dispersible (meth)acrylic polymer A used in the invention preferably has a weight average molecular weight (Mw) comprised between 2,000 and 100,000 Daltons. Preferably the Mw of this polymer A is at least 2,500 Daltons, typically at least 5,000 Daltons, more preferably at least 10,000 Daltons. Preferably the Mw of this polymer A is at most 50,000 Daltons, more preferably at most 20,000 Daltons.

The water-dispersible (meth)acrylic polymer A used in the invention preferably has a number average molecular weight (Mn) comprised between 1,000 and 25,000 Daltons, typically of between 1,000 and 20,000 Daltons. Preferably the Mn of this polymer A is at least 2,500 Daltons, typically at least 5,000 Daltons and preferably at most 10,000 Daltons.

The number average molecular weight (Mn) and weight average molecular weight (Mw) typically are measured by gel permeation chromatography (GPC). Samples are typically dissolved in THF and injected on a 3× PLgel 5 μm Mixed-D LS 300×7.5 mm column MW range 162 to 377400 g/mol calibrated with polystyrene standards, at 40° C.

The water-dispersible (meth)acrylic polymer A used in the invention preferably is a random copolymer containing pendant acidic groups, and containing pendant hydroxyl or isocyanate groups.

Typically the water-dispersible (meth)acrylic polymer A has a hydroxyl equivalent number from 0 meq/g to 1.5 meq/g. Typically the water-dispersible (meth)acrylic polymer A has a an isocyanate equivalent number of from 0 meq/g dry to 0.8 meq/g.

Water-dispersible (meth)acrylic polymers A having pendant hydroxyl groups usually have a hydroxyl equivalent number of at least 0.1 meq/g, often at least 0.2 meq/g, at least 0.3 meq/g or at least 0.35 meq/g. Typically they have a hydroxyl equivalent number of at most 0.9 meq/g, more typically at most 0.7 meq/g.

Water-dispersible (meth)acrylic polymers A having pendant isocyanate groups usually have an isocyanate equivalent number of at least 0.1 meq/g, often at least 0.2 meq/g. Typically they have an isocyanate equivalent number of at most 0.6 meq/g, more typically at most 0.3 meq/g.

Typically the water-dispersible (meth)acrylic polymer A has a carboxyl equivalent number of from 0 meq/g to 3.5 meq/g. Often the carboxyl equivalent number is at least 0.2 meq/g, most often at least 0.5 meq/g. Often the carboxyl equivalent is at most 2.5 meq/g, usually at most 1.8 meq/g, at most 1 meq/g, most often at most 0.7 meq/g.

The water-dispersible (meth)acrylic polymer A used in the invention can be prepared in any manner known to the skilled person using conventional methods but generally is prepared by free-radical polymerization using radical initiators and transfer agents.

In a first and preferred embodiment of the invention, the at least one ethylenically unsaturated polymer (1) is obtained by reacting a water-dispersible (meth)acrylic polymer A containing pendant hydroxyl groups, with at least one ethylenically unsaturated compound B1 that is the reaction product of at least one ethylenically unsaturated polyisocyanate (b1) and of at least one ethylenically unsaturated compound (b2) containing essentially one (or on average one) functional group capable of reacting with isocyanate groups, and, optionally, at least one neutralizing agent C.

Compounds B1 typically are selected from polyethylenically unsaturated compounds, used alone or in combination with one or more monoethylenically unsaturated compounds. Most preferably compounds B1 are polyethylenically unsaturated compounds.

The water-dispersible (meth)acrylic polymer A in this embodiment usually is prepared from copolymerizable monomers comprising:
- at least one (meth)acrylate (a1), which preferably is an alkyl (meth)acrylate with from 1 to 18 atoms in the alkyl chain,
- at least one hydroxy (meth)acrylate (a21) having at least one hydroxyl functionality, which preferably is a hydroxy alkyl (meth)acrylate with from 1 to 12 carbon atoms in the alkyl chain or a polyalkoxylated (meth)acrylate with from 2 to 300, more typically from 2 to 60 carbon atoms in the polyalkoxylated chain,
- at least one ethylenically unsaturated monomer (a3) containing at least one acidic group or the salt thereof capable to render the polymer dispersible in aqueous medium,
- optionally, at least one other ethylenically unsaturated monomer (a4) different from (a1) to (a3) and,
- optionally, at least one other ethylenically unsaturated monomer (a5) different from (a1) to (a4) and having a functional side chain capable to provide additional features to the polymer.

Monomers (a1) are (meth)acrylates. The term "(meth)acrylate" as used herein is meant to encompass both acrylate and methacrylate compounds, that are compounds that comprise at least one acrylate ($CH_2=CHCOO-$) and/or methacrylate ($CH_2=CCH_3COO-$) group. Compounds that contain only one (meth)acrylate functionality are highly preferred. Examples of such monomers include methyl (meth)acrylate, ethyl (meth)acrylate, propyl (meth)acrylate, n-butyl (meth)acrylate, iso-butyl (meth)acrylate, tert-butyl (meth)acrylate, pentyl (meth)acrylate, hexyl (meth)acrylate, cyclohexyl (meth)acrylate, 2-ethylhexyl (meth)acrylate, iso-octyl (meth)acrylate, nonyl (meth)acrylate, n-decyl (meth)acrylate, iso-decyl (meth)acrylate, lauryl (meth)acrylate, stearyl (meth)acrylate, benzyl (meth)acrylate, phenyl (meth)acrylate, 2-phenylethyl (meth)acrylate, 3-phenylpropyl (meth)acrylate, 2-methoxyethyl (meth)acrylate, 2-ethoxyethyl (meth)acrylate, butoxydiethyleneglycol (meth)acrylate, iso-bornyl (meth)acrylate, furfuryl (meth)acrylate, tetrahydrofurfuryl (meth)acrylate, dicyclopentenyl (meth)acrylate, dicyclopentenyloxyethyl (meth)acrylate, 4-tert-butylbutylcyclohexyl (meth)acrylate, beta-phenoxyethyl (meth)acrylate and the like. Preferred monomers (a1) are (meth)acrylate esters of a mono-functional alcohol that has from 1 to 18 carbon atoms, more preferably from 1 to 12, and most preferably from 1 to 6 carbon atoms in the alkyl chain. The alkyl chain can be linear or branched. Particularly suited are methyl (meth)acrylate, more in particular methyl methacrylate, and/or n-butyl (meth)acrylate, more in particular butylacrylate.

The hydroxy (meth)acrylates (a21) advantageously have at least one hydroxyl functionality. Preferred are hydroxy alkyl (meth)acrylates with from 1 to 12 carbon atoms in the alkyl chain. Equally suitable are polyalkoxylated (meth)acrylates with from 2 to 300 carbon atoms in the polyalkoxylated chain, more typically from 2 to 60 carbon atoms in the polyalkoxylated chain, in particular from 2 to 60 atoms in the polyalkylated chain. Examples thereof are the alkyl (meth)acrylate esters of a polyol. The alkyl chain may be linear or branched. By polyol is meant to designate an alcohol with at least 2 hydroxyl groups. Preferred are polyols that have a linear or branched alkyl chain with from 1 to 12, preferably from 1 to 6 and most preferably from 1 to 4 carbon atoms, and/or polyols that have a linear or branched polyoxyalkylated portion that contains from 2 to 300 carbon atoms, more in particular from 2 to 60 carbon atoms. Suitable examples of hydroxyl (meth)acrylates (a21) include hydroxyethyl(meth)acrylate, hydroxypropyl(meth)acrylate, hydroxybutyl(meth)acrylate, polyethyleneoxide mono(meth)acrylate, polypropyleneoxide mono(meth)acrylate and block copolymers of polyethyleneoxide and polypropyleneoxide, mono(meth)acrylate. Preferred are hydroxyethyl (meth)acrylate, and more in particular hydroxyethyl acrylate, and/or polyethyleneoxide mono(meth)acrylates such as polyethyleneglycol (n=6) monomethacrylate. Any of those hydroxy (meth)acrylates can be further reacted with lactones, which add to these hydroxyls in a ring-opening reaction. Examples of suitable lactones are γ-butyrolactone, δ-valerolactone and, in particular, ε-caprolactone. Glycolide and lactide can be used for the same purpose.

The acidic group of monomers (a3) may be selected from carboxylic acid, sulfonic acid and/or phosphonic acids. Suitable carboxylic monomers include (meth)acrylic acid, δ-carboxyethyl(meth)acrylate, crotonic acid, iso-crotonic acid, maleic acid, fumaric acid, itaconic acid, citraconic acid, 3-(meth)acrylamido-3-methylbutanoic acid, 10-(meth)acrylamido-undecanoic acid, 2-(meth)acrylamido-2-hydroxyacetic acid, vinyl acetic acid, allyl acetic acid, and salts thereof (of any of these). Acrylic acid and methacrylic acid, used alone or in combination, are preferred. Suitable sulfonic monomers include 2-(meth)acrylatoethyl sulfonic acid, 3-(meth)acrylatopropyl sulfonic acid, 2-(meth)acrylamido-2-methylpropane sulfonic acid, styrene sulfonic acid, vinyl sulfonic acid, and salts thereof (of any of these). Suitable phosphonic monomers include vinylphosphonic acid and salts thereof. The salts include any of those carboxylates, sulfonates and phosphonates where the cation is ammonium, trimethylammonium, triethylammonium, lithium, sodium, potassium and the like. Preferred monomers (a3) are (meth)acrylic acid (e.g. methacrylic acid) and/or vinylphosphonic acid.

Monomers used to prepare the water-dispersible (meth)acrylic polymer A used in the invention can, optionally, further comprise at least one other ethylenically unsaturated monomer (a4) different from monomers (a1) to (a3). Examples of such monomers (a4) include (meth)acrylamides as well as their derivates, hydroxyalkyl (meth)acrylamides having from 1 to 18 carbon atoms in the alkyl chain, (meth)acrylonitrile, styrenic monomers and/or vinylic monomers. Examples thereof are N-tert-butyl (meth)acrylamide, N-tert-hexyl (meth)acrylamide, N-tert-octyl (meth)acrylamide, N-(1-methylundecyl)-(meth)acrylamide, N-(1,5-dimethyl-1-hexyl)-(meth)acrylamide, N-(1,1-dimethyl-2-phenyl)ethyl-(meth)acrylamide, N-diphenylmethyl (meth)acrylamide, N-cyclohexyl (meth)acrylamide, N-(1-methylbutyl) (meth)acrylamide, N-phtalimidomethyl-(meth)acrylamide, N-(1,1,3-trimethyl-4,4'-dicyano-but-3-enyl)-(meth)acrylamide, styrene, alpha-methylstyrene, acrylonitrile, methacrylonitrile, N-vinylpyrrolidone, N-vinylcaprolactam, N-vinylcarbazole, N-vinylimidazole, N-acrylamido-1,3-dihydroxyisoindoline, vinyltoluene, vinylpropionate, vinylchloride, vinyl ethers like methylvinylether, ethylvinyether, propylvinylether, butylvinylether, iso-butylvinylether, hexylvinylether, cyclohexylvinylether, iso-octylvinylether, nonylvinylether, decylvinylether, dodecylvinylether, octadecylvinylether and the like, vinyl esters, and in particular vinyl esters of an alcohol having from 1 to 18 atoms in the alkyl chain, which may be linear or branched. Examples of such vinyl esters include vinylacetate and vinyl versatates obtained from C9, C10 or C11 versatic acid. When hydroxylated, the monomers (a4) can be further reacted with lactones, which add to these hydroxyls in a ring-opening reaction. Examples of suitable lactones are γ-butyrolactone, δ-valerolactone and, in particular, ε-caprolactone. Glycolide and lactide can be used for the same purpose. In the above, styrene, acrylamide and acrylonitrile are particularly preferred.

Monomers used to prepare the water-dispersible (meth) acrylic polymer A used in the invention can, optionally, further comprise at least one other ethylenically unsaturated monomer (a5) different from monomers (a1) to (a4) and having a functional side chain capable to provide additional features to the polymer. Examples of such other functional side chains include amine, epoxy, aziridine, ketone, acetoacetoxy, alkoxysilane, methylol, halogen and/or phosphorous groups. Examples of monomers (a5) bearing epoxy-functionality include epoxy(meth)acrylates having at least one (meth) acrylate group and at least one epoxy group. Examples of such compounds include glycidyl(meth)acrylate and epoxycyclohexyl(meth)acrylate. Examples of monomers (a5) bearing amino-functionality include dimethylaminoethyl (meth) acrylate, diethylaminoethyl (meth)acrylate, t-butylaminoethyl (meth)acrylate, 3-dimethylaminopropyl (meth)acrylamide, ureidoethyl (meth)acrylate, ureidoethyl (meth)acrylamide, 2-vinylpyridine, 4-vinyl pyridine, and the like. Examples of monomers (a5) bearing a phosphorous-functionality include (hydroxyl)phosphinyl-C1-4-alkyl (meth)acrylates, (dihydroxy)phosphinyl-C1-4-alkyl (meth) acrylates, hydroxyethyl(meth)acrylate mono-diphosphate esters, hydroxyethyl(meth)acrylate diphosphate esters, N-(1, 1-dimethyl-3-diethoxy-phosphono)propyl-(meth)acrylamide and the like. Examples of monomers (a5) bearing an halogen-functionality include trifluoroethyl(meth)acrylate. Examples of monomers (a5) bearing a ketone-functionality include diacetone acrylamide, acetoacetoxyethyl (meth)acrylate. Examples of monomers (a5) bearing an alkoxysilane-functionality include vinyltrimethoxysilane, vinyltriethoxysilane, vinylmethyldimethoxysilane, vinyl-tris-(2-methoxyethoxy)silane, gamma-methacryloxypropyltrimethoxysilane, gamma-methacryloxypropyltriethoxysilane. Other suitable examples of monomers (a5) include allyl(meth)acrylate, N-methylol (meth)acrylamide, n-butoxymethyl(meth)acrylamide, iso-butoxymethyl (meth)acrylamide. In a specific embodiment, the ethylenically unsaturated monomer (a5) with another functional side chain is selected between those compounds containing linear or branched C8-C24 alkyl side chains, capable of providing a tensioactive effect and of stabilizing the polymer in water. These molecules having at the same time the role of monomer and surfactant are referred to as "surfmers". Products falling in this category include alkyl polyethoxy (meth)acrylates, alkyl polypropoxy (meth)acrylates and tristyrylphenol polyethoxy (meth)acrylates. Preferred are monomers (a5) with epoxy and/or amine groups. Particularly suited is ureidoethyl (meth)acrylate.

The monomers (a1) to (a5) may be combined in any possible weight fraction, yet the amount of hydroxylated monomers (a21) used generally is limited to 50%, preferably to 25%, more preferably to 15%, most preferably to 10% or even to 5% by weight, based on the total weight of the monomers (a1) to (a5) used to prepare the water-dispersible (meth) acrylic polymer A. The amount of acidic monomers (a3) generally is limited to 25%, preferably to 10%, most preferably to 5% by weight, based on the total weight of the monomers (a1) to (a5) used. The amount of the optional additional monomers (a4) generally is limited to 25%, preferably to 15%, most preferably to 5% by weight, based on the total weight of the monomers (a1) to (a5) used. The amount of the optional functional monomer (a5) generally is limited to 25%, preferably to 10%, most preferably to 5%, by weight, based on the total weight of the monomers (a1) to (a5) used.

The amount of the water-dispersible (meth)acrylic polymer A used to prepare the polymer (1) of the invention usually is from 30% to 95% by weight, based on the total weight of the ethylenically unsaturated polymer (1). Preferably this amount is at least 50% by weight, more preferably at least 60% by weight. Preferably this amount is at most 80% by weight, more preferably at most 70% by weight.

By polyisocyanate (b1) is meant to designate organic compounds that comprise at least 2 isocyanate groups. Preferably the polyisocyanate (b1) comprises not more than 3 isocyanate groups. Diisocyanates are most preferred. The polyisocyanate compound is generally selected from aliphatic, cycloaliphatic, aromatic and/or heterocyclic polyisocyanates or combinations thereof. Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethylcyclohexane (isophorone diisocyanate, IPDI). Aliphatic polyisocyanates containing more than two isocyanate groups are for example the derivatives of above mentioned diisocyanates like 1,6-diisocyanatohexane biuret and trimer. Examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI).

The polyisocyanate is preferably selected from aliphatic and cycloaliphatic polyisocyanates. Especially preferred is 1,6-diisocyanatohexane (HDI).

The amount of polyisocyanate compound (b1) used to prepare the polymer (1) of the invention usually is from 0.1% to 25% by weight, more typically from 0.1% to 20% by weight, based on the total weight of the ethylenically unsaturated polymer (1). Preferably this amount is at least 1% by weight, typically at least 2% by weight, more preferably at least 2.5% by weight. Preferably this amount is at most 10% by weight, more preferably at most 5% by weight.

Compounds (b2) can be selected from one or more polyethylenically unsaturated compounds (b21) and/or from one or more monoethylenically unsaturated compounds (b22). Compounds (b2) typically are selected from polyethylenically unsaturated compounds (b21), used alone or in combination with one or more monoethylenically unsaturated compounds (b22). Most preferably compounds (b2) are polyethylenically unsaturated compounds. Monoethylenically unsaturated compounds can also be used alone though this is less preferred.

By a polyethylenically unsaturated compound (b21) is meant to designate a compound that contains at least 2 ethylenically unsaturated functions besides the essentially one (or on average one) reactive group capable of reacting with isocyanate groups, which preferably is a nucleophilic group capable of reacting with isocyanate groups, and most preferably is a hydroxyl group. The at least 2 ethylenically unsaturated functions can be selected from (meth)acrylic groups and/or allylic groups. By (meth)acrylic is meant to designate acrylic groups and/or methacrylic groups. Acrylic groups are preferred. Preferably the polyethylenically unsaturated compound (b21) is a mono-hydroxy poly(meth)acryloyl compound, most preferably it is a mono-hydroxy polyacryloyl compound. Useful compounds (b21) include e.g. the esterification products of aliphatic and/or aromatic polyols with (meth)acrylic acid having a residual average hydroxyl functionality of about 1. The partial esterification products of (meth)acrylic acid with tri-, tetra-, penta- and/or hexahydric polyols are preferred. It is also possible to use reaction products of such polyols with ethylene oxide and/or propylene oxide, or reaction products of such polyols with lactones, which add to these polyols in a ring-opening reaction. Examples of suitable lactones are γ-butyrolactone, δ-valerolactone and, in particular, δε-caprolactone. Glycolide and lactide can be used for the same purpose. These modified or unmodified polyols are partly esterified with acrylic acid, methacrylic acid or mixtures thereof until the desired hydroxyl functionality is reached. It is indeed known to those skilled in the art that the (meth)acrylation of polyols proceeds to a mixture of (meth)acrylate components and that an easy and suitable way to characterize the mixture is by measuring its hydroxyl value (mg KOH/g) using an appropriate method (e.g. a titration method).

Suitable compounds are the (meth)acrylic esters of linear and/or branched polyols in which at least one hydroxy functionality remains free. Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate, and their (poly)ethoxylated and/or (poly)propoxylated equivalents. Particularly preferred are polyacrylated pentaerythritol: a mixture containing essentially pentaerythritol diacrylate, pentaerythritol triacrylate and pentaerythritol tetraacrylate; and/or polyacrylated dipentaerythrytol: a mixture containing essentially dipentaerythritol tetraacrylate, dipentaerythritol pentaacrylate and dipentaerythritol hexaacrylate. Other suitable examples of compounds (b21) are compounds obtained from the reaction of (meth)acrylic acid with aliphatic, cycloaliphatic or aromatic compounds bearing an epoxy functionality and optionally at least one (meth)acrylic functionality. An example of products falling in this category is the reaction product of (meth)acrylic acid with glycidyl methacrylate.

Examples of monoethylenically unsaturated compounds (b22) that may be used are e.g. the monomers (a2) listed above. Other examples include compounds obtained from the reaction of an aliphatic, cycloaliphatic or aromatic carboxylic acid with another compound bearing at least one epoxy functionality and with a compound having one (meth)acrylate group and at least one carboxylic acid group. Preferred are compounds obtained from the reaction of an aliphatic, cycloaliphatic or aromatic carboxylic acid with another compound bearing one epoxy functionality and one ethylenically unsaturated functionality. Other preferred compounds are obtained from the reaction of an ethylenically unsaturated carboxylic acid with another compound bearing one epoxy functionality.

Particularly suitable is the reaction of the glycidyl ester of a C9-C11 versatic acid (e.g. Cardura®E10P) with (meth)acrylic acid.

The amount of the ethylenically unsaturated compounds (b2, in casu (b21) and/or (b22)) used to prepare the ethylenically unsaturated polymer (1) of the invention usually is from 1% to 60%, often from 5% to 60%, by weight, based on the total weight of the ethylenically unsaturated polymer (1). Preferably this amount is at least 10% by weight, more preferably at least 20% by weight. Preferably this amount is at most 50% by weight, more preferably at most 40% by weight. In this first embodiment the compounds (b1) and (b2) are typically used in an equivalent ratio of isocyanate to hydroxyl from 1:0.5 to 1:0.75, preferably from 1:0.5 to 1:0.6.

Preferably the weight ratio between polyethylenically unsaturated compounds (b21) and monoethylenically unsaturated compounds (b22) is from 1:0 to 0:1, preferably this ratio is from 1:0 to 1:1, more preferably this ratio is from 1:0 to 1:0.5, even more preferably this ratio is from 1:0 to 1:0.25, the most preferably this ratio is about 1:0.

The at least one ethylenically unsaturated compound B1 in this first embodiment preferably is characterized by a level of residual isocyanate functionality of between 0.1 and 3.75 meq/g, typically of between 0.1 and 3.5 meq/g. Preferably this level is a least 0.2 meq/g, more preferably at least 0.3 meq/g. Preferably this level is at most 2.0 meq/g, more preferably at most 1.0 meq/g. The at least one ethylenically unsaturated compound B1 in this first embodiment preferably is characterized by a level of allophanate functionality of between 0 and 1.0 meq/g. Preferably this level is a least 0.01 meq/g, more preferably at least 0.05 meq/g. Preferably this level is a most 0.75 meq/g, more preferably at most 0.5 meq/g.

Preferably the ethylenically unsaturated compound B1 in this first embodiment has a residual level of isocyanate functionality and a level of allophanate functionality as specified above.

In this first embodiment the compounds B1 and the water-dispersible (meth)acrylic polymer A are preferably used in an equivalent ratio of isocyanates to the total amount of hydroxyl groups provided by the water-dispersible (meth)acrylic polymer A from 0.05:1 to 1:1, preferably from 0.5:1 to 1:1, most preferably from 0.75:1 to 1:1. Where there is an excess of hydroxyl equivalents towards isocyanate equivalents, the ethylenically unsaturated polymer (1) contains residual pendant hydroxyl functions capable of being reacted thermally after the application of the polymer dispersion, for instance by a dual cure mechanism.

Preferably the level of free isocyanates (b1) after reaction of the compound B1 with the water-dispersible (meth)acrylic polymer A is as low as possible. Preferably this level is between 0 and 0.05 meq/g of ethylenically unsaturated polymer (1). Preferably this level is at most 0.02 meq/g. Preferably the IOH of compounds (b21) is selected in the lower range to avoid the presence of high(er) amounts of polyhydroxylated molecules which may lead to the formation of too high molecular weight products and possibly to the formation of gels. By polyhydroxylated is meant to designate compounds (b21) comprising two or more hydroxyl groups.

Preferably compounds (b21) comprise less than 10 wt %, more preferably less than 5 wt %, even more preferably less than 3 wt % of molecules that contain two or more hydroxyl groups, relative to the total amount of compounds (b21), e.g. to secure a better control of the MW and viscosity of polymers (1) of the invention.

Preferably, the urethanization step is followed by the further formation of allophanates from the reaction of 0.1 to 25%, preferably 1 to 20%, most preferably 10 to 20% of the isocyanate level obtained after the completion of the stoechiometric reaction between the isocyanate (b1) and the polyacrylate (b21). This procedure aims to reduce the level of free polyisocyanate (b1) and at the same time increases the (meth)acrylate functionality of the adduct (B1).

In a second embodiment of the invention the at least one ethylenically unsaturated polymer (1) is obtained by reacting a water-dispersible (meth)acrylic polymer A containing pendant isocyanate groups, with at least one ethylenically unsaturated compound B2 that is an ethylenically unsaturated compound (b2) containing essentially one (or on average one) functional group capable of reacting with isocyanate groups, and, optionally, with at least one neutralizing agent C. Compounds B2 typically are selected from polyethylenically unsaturated compounds, used alone or in combination with one or more monoethylenically unsaturated compounds. Most preferably compounds B2 are polyethylenically unsaturated compounds. Examples of such compounds are given above—see (b21) and (b22).

In this second embodiment of the invention, the water-dispersible (meth)acrylic polymer A can be prepared from monomers (a1) to (a5) as described above, with the exception that monomers (a21) are replaced by one or more ethylenically unsaturated monomers (a22) containing at least one isocyanate functionality capable of reacting with the at least one compound (b2) (or (B2)). Examples of such monomers (a22) include 2-isocyanatoethyl methacrylate (MOI®, Showa Denko), 2-isocyanatoethylacrylate (AOI®, Showa Denko), 1,1-bis(acryloyloxymethyl)ethylisocyanate (BEI®, Sowa Denko) and the alpha,alpha'-dimethyl-m-isopropenyl-benzyl isocyanate (TMI®, Cytec). It can also be the monoadduct between an aliphatic or aromatic diisocyanate and an hydroxyalkyl(meth)acrylate. Suitable examples of such monomers are for instance the monoadducts between HDI, IPDI, H12MDI, TDI or MDI and hydroxyethyl(meth)acrylate, hydroxypropyl(meth)acrylate or hydroxybutyl(meth)acrylate. The amount of isocyanate monomers (a22) used generally is limited to 25%, preferably to 15%, most preferably to 5% by weight, based on the total weight of the monomers (a1) to (a5) used to prepare the water-dispersible (meth) acrylic polymer A.

In this second embodiment of the invention the grafting of the acrylic polymer can happen directly by the reaction with the ethylenically unsaturated compound (b2) (or (B2)) without the need for making a preliminary urethane-functional adduct. Another benefit of this approach is related to the possibility to graft any additional suitable compound having a functionality capable to react with isocyanates. Suitable compounds falling into this category are alkyl alcohols; alkylaryl alcohols; ethoxylated and/or propoxylated alkyl alcohols; and ethoxylated and/or propoxylated alkylaryl alcohols.

In a first variant of the invention, the radiation curable aqueous compositions can comprise at least one unsaturated polymer (1) according to the first embodiment described above.

In a second variant of the invention, the radiation curable aqueous compositions can comprise at least one unsaturated polymer (1) according to the second embodiment described above.

In a third variant of the invention, the radiation curable aqueous compositions can comprise at least one unsaturated polymer (1) according to this first embodiment and at least one unsaturated polymer (1) according to this second embodiment.

The optional neutralizing agent C, in any of the above embodiments or variants, can be any suitable organic or inorganic neutralizing agent. Suitable for use in the present invention are for instance ammonia, volatile organic amines and/or inorganic bases selected from metal hydroxides, hydrides, carbonates and bicarbonates. Particularly suited volatile organic amines are volatile organic tertiary amines such as trimethylamine, triethylamine, triisopropylamine, tributylamine, N,N-dimethylcyclohexylamine, N,N-dimethylaniline, N-methylmorpholine, N-ethylmorpholine, N-methylpiperazine, N-methylpyrrolidine, N-methylpiperidine and the like. Particularly suited inorganic bases are non-volatile inorganic bases comprising monovalent metal cations, preferably alkali metals such as lithium, sodium and potassium and anions such as hydroxides, hydrides, carbonates and bicarbonates. The total amount of these neutralizing agents can be calculated according to the total amount of acid groups to be neutralized. The neutralizing agent can be used with an equivalent ratio varying from 0.5:1 to 1:1 based on the groups to neutralize, such as acidic groups. More preferred is an equivalent ratio of from 0.9:1 to 1:1. Generally a stoechiometric ratio of about 1:1 is the most preferred.

Preferably the ethylenically unsaturated polymer (1) according to the invention has a residual level of hydroxyl functionality of between 0 and 2 meq/g. This level preferably is at most 1 meq/g, more preferably at most 0.5 meq/g. This level preferably is at least 0.01 meq/g, more preferably at least 0.05 meq/g.

Preferably the ethylenically unsaturated polymer (1) according to the invention has a residual level of ethylenically unsaturated functions of between 0.1 and 6 meq/g, often of between 1 and 6 meq/g. This level preferably is at most 5 meq/g, more preferably at most 4 meq/g. This level preferably is at least 1 meq/g, more preferably at least 1.5 meq/g, even more preferably at least 2 meq/g, most preferably at least 3 meq/g.

Preferably the ethylenically unsaturated polymer (1) according to the invention is characterized by a glass transition temperature (Tg) comprised between −50° C. and +100° C. Preferably the Tg is at least −20° C., more preferably at least 0° C. Preferably the Tg is at most 70° C., more preferably at most 50° C.

Preferably the ethylenically unsaturated polymer (1) has a residual level of hydroxyl functionality, a residual level of ethylenically unsaturated functions, and preferably also a glass transition temperature as specified above.

In a preferred embodiment the ethylenically unsaturated polymer (1) of the invention is a (meth)acrylated acrylic polymer, more preferably an acrylated acrylic polymer.

The amount of the ethylenically unsaturated polymer (1) in the composition of the invention is generally between 10% and 45% by weight. Preferably this amount is at least 25% by weight, and preferably at most 35% by weight, based on the total weight of the radiation curable aqueous composition of the invention.

The composition of the invention besides the at least one ethylenically unsaturated polymer (1) can, optionally, comprise at least one further ethylenically unsaturated compound (2) and/or at least one emulsifier (3). By "further" is meant to designate herein a compound different from the ethylenically unsaturated polymer (1).

Typically the ethylenically unsaturated compound (2) is a polyethylenically unsaturated compound.

The ethylenically unsaturated compound (2) can be a polyethylenically unsaturated compound (21) comprising e.g. essentially no (most preferably no) functionality which is capable to react with an isocyanate group. Alternatively, the ethylenically unsaturated compound (2) can be a polyethylenically unsaturated compound (21) comprising a functionality which is capable to react with an isocyanate group.

Aliphatic and aromatic polyhydric polyols which have been totally esterified with (meth)acrylic acid and contain substantially no hydroxyl functionality in the molecule are particularly preferred. Suitable are the esterification products of (meth)acrylic acid with di, tri-, tetra-, penta- and/or hexahydric polyols and mixtures thereof. Suited are in particular the esterification products of (meth)acrylic acid with tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Glycolide and lactide can be used for the same purpose. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until substantially no hydroxyl functionality remains. Examples of poly-unsaturated compounds from this category are diethyleneglycol di-acrylate, triethyleneglycol di-acrylate, dipropyleneglycol di-acrylate, tripropyleneglycol di-acrylate, 1,3-propanediol di-acrylate, 2,3-butanediol di-acrylate, di-acrylates from renewable polyols, trimethylolpropane tri-acrylate, glycerol tri-acrylate, pentaerythritol tetra-acrylate, di-trimethylolpropane tetra-acrylate, dipentaerythritol hexa-acrylate and their (poly)ethoxylated and/or (poly)propoxylated equivalents, as well as mixtures thereof. It is also possible to use any compound from the category of urethane(meth)acrylates, epoxy(meth)acrylates and/or polyester(meth)acrylates. An easy and suitable way to characterize the product is by measuring its hydroxyl value that must be close to zero.

Further suited are low molecular weight poly(meth)acryloyl-containing compounds (22), more preferably low molecular weight polyacryloyl-containing compounds. Particularly suitable are polyester (meth)acrylates, urethane (meth)acrylates, epoxy (meth)acrylates, polyether (meth)acrylates and/or amine (meth)acrylates with at least two (meth)acryl groups and a molecular weight from 200 to 5,000 Daltons, often from 220 to 5,000 Daltons, preferably at most 3,000 Daltons, most preferably at most 1,000 Daltons. Molecular weights of such low molecular weight compounds are often calculated, especially if the molecular weight is below 1,000 Daltons. Particularly preferred in this category are low molecular weight urethane (meth)acrylates and/or epoxy (meth)acrylates. Molecular weights of such low molecular weight compounds are often calculated, especially if the molecular weight is below 1,000 Daltons.

Urethane (meth)acrylates can be prepared by reacting a polyisocyanate (preferably a diisocyanate) such as hexamethylene-diisocyanate (HDI), isophorone-diisocyanate (IPDI), 1,1'-methylene bis[4-isocyanatocyclohexane] (H12MDI), toluene-diisocyanate (TDI), with an hydroxyl functional (meth)acrylate. In order to extend the chain, mono- and/or polyhydroxy alcohols, preferably polyhydroxy alcohols, can be added and/or polyesters, polyethers or polycarbonates containing hydroxy groups can be added to provide, respectively, polyester urethanes, polyether urethanes, polycarbonate urethanes containing (meth)acrylic unsaturations. Preferably, the urethane (meth)acrylates have a number-average molecular weight (Mn) of less than 5,000. Most preferred are urethane acrylates commercialized as EBECRYL®1290, EBECRYL®230, EBECRYL®270 and EBECRYL®4883.

Epoxy(meth)acrylates can be obtained by the reaction of (meth)acrylic acid with epoxides, preferably polyepoxides, i.e. compounds comprising at least two epoxide functions. The polyepoxides are generally chosen from glycidyl ethers of aromatic or aliphatic alcohols, polyols and from cycloaliphatic polyepoxides. Preferred epoxides are diglycidylethers of aromatic and aliphatic diols and cycloaliphatic diepoxides, such as the diglycidyl ether of bisphenol-A, diglycidyl ether of bisphenol-F, diglycidylether of poly(ethylene oxide-co-propylene oxide), diglycidyl ether of polyethylene oxide, diglycidylether of polypropylene oxide, diglycidylether of 1,6-hexanediol, diglycidylether of 1,4-butanediol, 1,3-propanediol, 2,3-butanediol, suitable renewable diols etc. Particularly preferred is diglycidyl ether of bisphenol-A. Also epoxidized natural oils or epoxidized phenolformaldehyde copolymers (also known as novolacs) can be used. Examples of natural oils include soybean oil, linseed oil, perilla oil, fish oil, dehydrated castor oil, tung oil, coconut oil, corn oil, cottonseed oil, olive oil, palm oil, palm kernel oil, peanut oil, sunflower oil, safflower oil, castor oil. Particularly suited epoxidized natural oils include epoxidized soya oil tri- and tetraacrylate, epoxidized castor oil triacrylate, epoxidized linseed oil tetra- and pentaacrylate. These ethylenically unsaturated compounds (22) can be incorporated either during or after the reaction process, prior to dispersion in water, or after the polymer dispersion. These compounds generally are either self-emulsifying, or they are externally emulsified in the presence of the ethylenically unsaturated (meth)acrylic polymer (1) in the dispersion. It is also possible to emulsify them prior to being added to the ethylenically unsaturated (meth)acrylic polymer (1) in the dispersion.

The amount of ethylenically unsaturated compounds (22) in the radiation curable aqueous composition of the invention usually is between 1% and 50% by weight, based on the total weight of the ethylenically unsaturated (meth)acrylic polymer (1). Preferably this amount is at least 10% by weight and preferably at most 25% by weight.

Other compounds (2) that may, optionally, be added to the composition of the invention are oligomers or polymers (23) that are different from (1) and that preferably contain at least one ethylenically unsaturated functionality, though they can contain any other functionality capable of imparting any desired properties to the final composition. These compounds (23) typically have a weight-average molecular weight of between 1,000 and 10,000,000 Daltons, often of between 3,000 and 10,000,000 Daltons as measured by GPC. Preferably the molecular weight of these compounds (23) is at least 5,000, more preferably at least 10,000 Daltons. Preferably the molecular weight of these compounds (23) is at most 50,000, more preferably at most 20,000 Daltons.

Such compounds (23) may be selected from one or more (meth)acrylates of: polyurethanes, polyesters, polyethers and/or polyepoxies.

Depending on their nature, compounds (23) can be dispersed into the unsaturated (meth)acrylic dispersion (1) or simply be added to it in the case that they are available as a stable waterborne dispersion or emulsion. Alternatively, these compounds (23) can be added during the production of the ethylenically unsaturated polymer (1), id est in any step prior to neutralization (which is optional) and dispersion in water. Preferably, compounds (23) are added as a stable waterborne dispersion.

The amount of compounds (23) in the radiation curable aqueous composition of the invention usually is between 0% and 50%, typically between 1% and 50%, by weight, based on the total weight of the ethylenically unsaturated (meth)acrylic polymer (1). Preferably this amount is at least 10%, by weight, and preferably at most 25%, by weight.

The ratio between the optional compounds (23) and the total weight of the ethylenically unsaturated (meth)acrylic polymer (1) in the radiation curable aqueous composition of the invention usually is between 0.01:1 and 1:0.01 by weight, typically between 0.05:1 and 1:0.05 by weight. Preferably this amount is between 0.01:1 and 1:0.01 by weight, more preferably between 0.1:1 and 1:0.1 by weight, more preferably between 0.25:1 and 1:0.25 by weight.

Radiation curable polyurethane dispersions are widely described and can be used ideally for this purpose. The state of the art generally includes anionically or nonionically stabilized (meth)acrylated polyurethane colloids in water. A suitable polymer composition is obtained from the capping or the chain extension of an isocyanate-terminated ionomeric polyurethane oligomer with a mono or poly(meth)acrylated molecule having at least one chemical functionality capable to react with isocyanates. An example is a (meth)acrylated polyurethane obtained from the reaction of a diisocyanate (like isophorone diisocyanate), often, a polyol (selected between polyesters, polyethers and polycarbonates), a functional polyol (like dimethylolpropionic acid), a poly(meth) acrylate compound (like pentaerythrytol triacrylate), often, a polyamine (like hexamethylene diamine) and, often, an amine (like triethylamine) followed by the subsequent dispersion of the oligomer in water. These dispersions can be further stabilized with an ionic and/or nonionic surfactant (like a polyalkoxylated fatty alcohol). Products that enter in this category are Ucecoat®7177, Ucecoat®7849, Ucecoat®7571, Ucecoat®7631, Ucecoat®7655, Ucecoat®7698 and Ucecoat®7699.

Polyester (meth)acrylates can be obtained by reacting a hydroxyl group-containing polyester backbone with (meth) acrylic acid, or by reacting a carboxyl group-containing polyester backbone with a hydroxyalkyl (meth)acrylate such as for example 2-hydroxyethyl acrylate, 2- or 3-hydroxypropyl acrylate, etc. or with glycidyl methacrylate. The polyester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc, and/or the ethoxylates and/or propoxylates thereof, with at least one mono- and/or polycarboxylic acid such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones can be used as polyester backbone. For example poly (ε-caprolactone) obtained by ring-opening polymerization of ε-caprolactone, optionally in the presence of one or more polyhydroxy alcohols, can be used. Glycolide and lactide can be used for the same purpose. It is possible to introduce any desired ionic group and/or nonionic group for the stable dispersion of the polymer in water. An example of monomer useful for that purpose is 5-sodiosulfo-isophtalic acid (SSIPA).

Polyether(meth)acrylates can be prepared by esterification of hydroxyfunctional polyethers with (meth)acrylic acid. Hydroxyfunctional polyethers can be obtained by ring-opening homo- or copolymerization of cyclic ethers such as tetrahydrofuran, ethylene oxide and/or propylene oxide or can be prepared by reacting polyhydroxy alcohols with ethylene and/or propylene oxide. The intrinsic hydrophilic & nonionic nature of these products makes them suitable for stable solutions or dispersions in water.

The emulsifier (3) may be any suitable emulsifier. Suitable emulsifiers include ionic surfactants, nonionic surfactants, and mixtures thereof. Examples of anionic surfactants include ammonium, sodium or potassium salts of C8-C24 linear or branched alkyl and alkylalkoxylate sulfates, sulfonates, phosphates and succinates, with the alkylene oxide units being in a range between 6 to 50; or ammonium, sodium or potassium salts of C8-C24 linear or branched alkylphenolalkoxylate sulfates, sulfonates, phosphates and succinates, with the alkylene oxide units being in a range between 6 to 50. Examples of nonionic surfactants include oxyalkylated C8-C24 linear or branched alkyl alcohols and alkylphenols, with the alkylene oxide units being in a range from 6 to 50; or alternatively, ethylene oxide/propylene oxide block copolymers, which can optionally be totally or partially blocked by an aryl and/or alkyl chain. The surfactants in general are used at a level from 0.01% to 10% by weight, based on the total weight of the radiation curable aqueous composition of the invention. Preferably the amount of the optional surfactants is at least 1% by weight and preferably at most 3% by weight.

The compositions of the invention can further include additional ingredients such as solvents, catalysts, initiators, inhibitors, transfer agents, cross-linking agents, biocides, pigments, dyestuffs, fillers, additives such as adhesion promoters, leveling additives, anti-settling additives and flow additives, etc. An example of an adhesion promoter that may be added is EBECRYL®430.

The production of the water-dispersible (meth)acrylic polymer A can e.g. proceed in the presence of one or more water-soluble solvents with a low boiling point, more in particular a boiling point below 100° C., preferably below 90° C., more preferably below 80° C. These solvents are used as processing aid to reduce the viscosity of the polymer solution during the process and can be eliminated afterwards by vacuum and/or water vapor stripping of the dispersion. It is also possible to use one or more water-soluble solvents with a high boiling point, more in particular a boiling point above 100° C. for these purposes. These solvents are used as processing aid to reduce the viscosity of the polymer solution but stay in the final polymer dispersion, and can e.g. facilitate the film formation. They contain moreover no chemical functionality capable of reacting with isocyanates. Useful solvents falling in this category are additionally capable of serving as coalescence aid during the film formation of the polymer dispersion. Useful nitrogenated solvents include N-methylpyrrolidone and/or N-ethylpyrrolidone. Useful oxygenated solvents are preferably selected from: (i) the fully reacted alkyl or aryl esters of aromatic, aliphatic or cycloaliphatic polycarboxylic acids, (ii) the fully reacted alkyl or aryl esters of aromatic, aliphatic or cycloaliphatic polyglycols, (ii) the fully reacted alkyl or aryl ethers of aromatic, aliphatic or cycloaliphatic polyglycols, and (iv) cyclic carbonates optionally substituted with alkyl and/or aryl groups. Suitable oxygenated coalescing solvents include the dimethyl esters and/or diisobutyl esters of adipic, glutaric, succinic or phtalic acids and their blends; the ethyl-3-ethoxypropionate (EK-TAPRO EEP, Eastman), the 2,2,4-trimethyl-1,3-pentanediol-diisobutirate (KODAFLEX TXBI, Eastman), propyleneglycol diacetate (DOWANOL PGDA), dipropylene glycol dimethyl ether (PROGLYDE DMM), ethylene carbonate and propylene carbonate.

If added during the preparation of the water-dispersible (meth)acrylic polymer A, solvents typically are used in an amount of 5% to 60% by weight, preferably 10% to 30% by weight, more preferably 20% to 30% by weight, based on the total weight of the polymer A. Solvents used are preferably selected within the low boiling point range (below 100° C.) so that they can be stripped out of the dispersion under vacuum and/or water vapor stream. The compositions according to the present invention preferably do not contain a coalescing solvent. The compositions according to the present invention preferably do not make use of any process solvents when the resulting viscosity can be handled during the whole process.

The compositions according to the present invention preferably are prepared in a solvent-free process.

To achieve a good control of the molecular weight and its distribution, a chain transfer agent can e.g. be added during the preparation of the water-dispersible (meth)acrylic polymer A. The chain transfer agent preferably is of the mercaptan type, such as n-octylmercaptan, iso-octylmercaptan, n-dodecylmercaptan, t-dodecylmercaptan. It can also be of carbon halide type, such as carbon tetrabromide or bromotrichloromethane. Transfer agents may also be selected from organo-metallic compounds used as a catalytic chain transfer. The chain transfer agent is generally used in amounts of 0.01% to 10% by weight of the monomers used in the preparation of water-dispersible (meth)acrylic polymer A, preferably from 1% to 5% by weight, most preferably from 1% to 3% by weight.

In general thermal radical initiators are added. Thermal radical initiators generate radicals upon thermal decomposition and are suitable to initiate the radical chain polymerization of the ethylenically unsaturated monomers (a1) to (a5). They are characterized by a half-time of decomposition ($t_{1/2}$), corresponding to the typical time required to decompose half of the initial amount of initiator, that varies with the temperature. The thermal initiator is preferably selected so that the half-time of decomposition ($t_{1/2}$) matches the desired reaction temperature. Examples of suitable radical initiators include peroxides, such as dicumyl peroxide, tert-butyl peroxyacetate, 2,2'-bis(tert-butylperoxy)butane, 1,1'-bis(tert-butylperoxy)cyclohexane, dibenzoyl peroxide, dioctanoyl peroxide, dicetyl peroxydicarbonate, bis(4-tert-butylcyclohexyl)peroxydicarbonate, tert-amyl peroxyneodecanoate and azo compounds, such as 2,2'-azobis(2,4-dimethylpentane, 2,2'-azobis(2-methylpropanenitrile), 2,2'-azobis(2-methylbutanenitrile), 1,1'-azobis(cyclohexanecarbonitrile) and the like. Preferred is a thermal radical initiator being characterized by a critical decomposition temperature (CDT), corresponding to the half-time of decomposition ($t_{1/2}$) of 0.1 hour, not exceeding 90° C., preferably not exceeding 89° C., more preferably not exceeding 88° C. and most preferably not exceeding 87° C. These conditions permit the rapid and efficient destruction of the thermal radical initiator at a remaining level below 50 ppm (on the polymer) and at a temperature significantly superior to the polymerization temperature but not exceeding the boiling temperature (at 760 mm Hg) of the reaction solvent, which preferably is below 100° C., more preferably is below 90° C., most preferably does not exceed 80° C. The thermal decomposition of the initiator may be facilitated by the use of a redox reaction involving an additional reducing agent like sodium formaldehyde sulfoxylate. The initiators may be used, for example, in amounts from 0.1% to 5% by weight of the starting monomers (a1) to (a5), preferably from 0.5% to 2% by weight, most preferably from 1% to 2% weight.

Catalysts can be used to facilitate the reaction between the isocyanates and the hydroxyl functions during the urethanization step (the step of attaching compound B to the water-dispersible (meth)acrylic polymer A). They include metal salts from Tin, Bismuth and the like. Preferred catalysts are dibutyltin dilaurate and bismuth octoate. An amine catalyst can also be used, alone or in conjunction with the above metallic catalysts. Suitable amine catalysts include for instance 1,4-diazabicyclo[2,2,2]octane (DABCO). The catalyst may be used, for example, in amounts from 0.005% (50 ppm) to 0.1% (1000 ppm) based on the total weight of the polymer (1). Examples of suitable radical inhibitors for use during the urethanization step include hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. Other examples of suitable inhibitors include phosphines, like triphenylphosphine (TPP), and tris-nonylphenylphosphite (TNPP), phenothiazine (PTZ), triphenyl antimony (TPS), and any mixtures thereof. The total amount of inhibitor used is generally from 0 to 1% by weight of the polymer (1), preferably from 0.01% to 0.5% by weight, most preferably from 0.01% to 0.1% by weight.

The composition of the invention may also comprise at least one photochemical initiator capable of initiating the polymerization of the radiation curable polymer composition under UV light. Photochemical initiators (also called photoinitiators) are compounds that can generate radicals by absorption of light, typically UV light. The amount of photoinitiator in the composition is preferably comprised between 0.1% and 10% by weight, more preferably between 1 and 5% by weight, most preferably between 1% and 2% by weight, based on the total weight of the radiation curable aqueous composition of the invention. The composition according to the invention may also comprise from 0 to 5% by weight of one or more photosensitizers well known in the art. Alternatively, the composition can be cured in the absence of an initiator, especially by electron beam.

The ethylenically unsaturated polymer (1) of the present invention may have a residual hydroxyl functionality, and may be subjected to dual cure with the use of an additional thermal crosslinking reaction taking place in the absence of radiation. Examples of suitable external crosslinkers are (blocked) polyisocyanates, polyaziridines, polyepoxydes, polycarbodiimide, polyalkoxysilanes, and/or metal salts like zirconium ammonium carbonate. Melamine derivatives like hexamethoxymethyl melamine and the like may also be suitable for higher temperature crosslinking. Some external crosslinkers are associated with shelf-life limitations of the formulation. Particularly suitable are polyisocyanates like BAYHYDUR® 3100. Crosslinkers may be used in the invention at a level from 0.01% to 10% by weight, based on the total weight of the radiation curable aqueous composition of the invention. Preferably the amount of the optional crosslinkers is at least 1% by weight and preferably at most 5% by weight.

The compositions of the invention may also comprise inert or functional resins, pigments, colorants, fillers and/or other additives suitable to improve the application of the formulated dispersion on a substrate and including not limitatively dispersing agents, wetting agents, emulsifying agents, antioxidants, flow modification agents, slip agents, fire retardant agents, UV-protection agents, adhesion promoters, and mixtures thereof. The total amount of pigments, colorants, inert resins, fillers and/or additives in the radiation curable aqueous composition of the invention generally does not exceed 60% by weight, preferably it does not exceed 40% by weight.

The present invention also provides a process for the preparation of radiation curable aqueous compositions of the invention. Such process in general comprises the steps of
(i) preparing a water-dispersible (meth)acrylic polymer A containing pendant hydroxyl or isocyanate groups, and containing pendant groups capable to render the polymer A dispersible in aqueous medium either directly or after reaction with a neutralizing agent,
(ii) preparing an ethylenically unsaturated compound B which can be radically polymerized under irradiation and is capable of attaching to the (meth)acrylic polymer A by an urethane linkage, (iii) preparing a grafted unsaturated (meth)acrylic polymer by reacting the (meth)acrylic polymer A with the ethylenically unsaturated compound B in the absence or the presence of a solvent, and (iv) dispersing the grafted ethylenically unsaturated polymer (1) in water.

Generally the dispersion step is preceded by a neutralization step with a neutralizing agent C. When preceded by a neutralization step, dispersion in water typically immediately follows neutralization. The dispersion step may be followed by a stripping step to remove volatile solvents if present. Stripping in general is performed until the residual solvent falls below 0.5% by weight of the water dispersion, preferably below 0.15% by weight of the water dispersion As indicated above, further ingredients and/or additives may be added to the composition of the invention. Depending on the nature of the compound added, the compound may be added during any of steps (i) to (iii), or at the contrary, after dispersion of the grafted ethylenically unsaturated polymer (1) in water. Where needed a further emulsifier is added. Details on the ways to prepare the water-dispersible (meth)acrylic polymer A and the ethylenically unsaturated compound B, the reactants used and their preferred amounts can be found above.

Each of the above steps are now described in more detail for a preferred embodiment according to the invention.

Step 1

A water-dispersible (meth)acrylic polymer A is prepared by the radical copolymerization of ethylenically unsaturated monomers (a1) to (a5), either in the absence of solvent or in the presence of a solvent suitable to limit the viscosity during the process step. The solvent can be selected between low-boiling point solvents (<100° C.) and high boiling point solvents (>100° C.) and is miscible with water. The low boiling-point solvents are preferred because they can be eliminated under vacuum and/or with vapor stripping of the polymer dispersion. The solvent can be used in an amount of from 5% to 60%, preferably from 20% to 30% by weight, based on the monomers. This reaction may take place in a manner known to the skilled person by using conventional methods, particularly by free-radical solution polymerization using radical initiators and transfer agents. The copolymerization is generally carried out at a temperature of 20 to 150° C., preferably between 50 and 90° C. The reaction is carried out using either a one shot process (where all the reagents are mixed together), or a full monomer delay where the totality of the monomers are added over a certain period of time ranging from 1 to 12 hours, preferably from 2 to 6 hours. In the case of a monomer delay, it is also possible to select an aliquot of the monomers as an amorce for the radical reaction and then proceed with delayed addition of the residual monomers. The amorce is generally constituted by 5 to 30 weight % of the monomer mix, preferably from 5 to 15%. The polymer synthesis can be followed by one or more additions of an initiator, decomposing thermally either in a spontaneous way, or assisted by a redox reaction implying a couple of oxidant:reductor, happening at the same temperature or any other temperature, in order to reduce the free monomer level. In general, the polymerization process is taking place at a fixed temperature, usually at the boiling point of the solvent in the reaction mixture which is giving an advantage for the good control of the reaction exothermicity. It can however be desirable to apply a sequential temperature process where the polymerization and monomer chasing take place at a temperature below the boiling point of the solvent and where the temperature is increased, possibly up to the boiling point of the solvent, for a period of time suitable for the full decomposition of the thermal initiator that is then not hindering the next (poly)acrylate (compound B) grafting operation during which thermal initiation is absolutely forbidden.

The polymer A preferably is a random copolymer containing pendant hydroxyl and acidic functional groups, and having a number-average molecular weight between 1,000 and 25,000 Daltons, often between 1,000 and 20,000 Daltons, preferably between 5,000 and 10,000 Daltons, and a weight-average molecular weight between 2,000 and 100,000 Daltons, often between 10,000 and 100,000 Daltons, preferably between 5,000 and 50,000 Daltons, more preferably between 10,000 and 20,000 Daltons. The number average molecular weight (Mn) and weight average molecular weight (Mw) are measured by GPC (samples dissolved in THF and injected on a 3× PLgel 5 µm Mixed-D LS 300×7.5 mm column MW range 162 to 377400 g/mol calibrated with polystyrene standards, at 40° C.).

The polymer A is stable as a solution and can be stored at ambient temperature for an extended period of time until it is being used during step 3.

Step 2:

A poly(meth)acrylate adduct is prepared from the condensation of a polyisocyanate molecule containing preferably two isocyanate groups with a poly(meth)acrylate molecule containing preferably one functionality capable to react with the isocyanates. This functionality is preferably a hydroxyl group. The reactants are reacted using a controlled stoechiometry implying an equivalent ratio of isocyanate:hydroxyl from 1:0.5 to 1:0.75, preferably from 1:0.5 to 1:0.6. The reaction is being made either in the presence of a solvent or without any solvent. The solvent-free process is being preferred if the adduct viscosity allows. The reaction in the second step may take place at temperatures from 20 to 150° C., preferably from 50 to 90° C., with or without the presence of urethanization catalysts. The reaction is carried out using either a one shot process (where all the reagents are mixed together) or using an incremental addition of one reactant on the other over a certain period of time ranging from 1 to 12 hours, preferably from 2 to 6 hours. The reaction is followed by recording the decrease of the isocyanate level I[NCO] up to the theoretical value corresponding to the completion of the reaction. The isocyanate content I[NCO] can be followed by the classical back titration method using dibutylamine. It can be desired to proceed the reaction further down the theoretical isocyanate level I[NCO] and thus proceed to an extra consumption of the isocyanates corresponding to a decrease of 0 to 50% of the I[NCO], preferably of 10% to 30%, corresponding to the formation of higher molecular weight components having an additional allophanate functionality. It is also desired to reduce the level of free polyisocyanate molecules as low as possible, preferably between 0 and 5% based on the poly(meth)acrylate adduct, preferably between 0 and 1%.

Step 3:

An ethylenically unsaturated polymer (1) is prepared by the reaction between the functional polymer from step 1 and the adduct of step 2, either in the absence or in the presence of a solvent. In this embodiment of the invention, the equivalent ratio of isocyanates to the total amount of hydroxyl groups provided by the (meth)acrylic polymer A is preferably from 0.05:1 to 1:1 to, more preferably from 0.5:1 to 1:1, most preferably from 0.75:1 to 1:1. In the case where there is an excess of hydroxyl equivalents towards isocyanate equivalents, the ethylenically unsaturated polymer (1) still contains pendant hydroxyl functions capable to be reacted thermally after the application of the polymer dispersion, for instance by a dual cure system. The reaction in the third step may take place at temperatures between 20 to 150° C., preferably between 50 to 90° C., with or without the presence of urethanization catalysts. The reaction is carried out using either a one shot process (where all the reagents are mixed together) or an incremental addition of one reactant on the other over a certain period of time ranging from 1 to 12 hours, preferably from 2 to 6 hours. The reaction is followed by recording the decrease of the isocyanate level I[NCO] up to the theoretical value corresponding to the completion of the reaction. The isocyanate content I[NCO] can be followed by the classical back titration method using dibutylamine. In a specific embodiment of the invention, reaction is followed until the isocyanate level I[NCO] drops to zero. The acrylic polymer preferably has a level of ethylenically unsaturated bonds from 0.1 to 6 meq/g of polymer (1), typically from 1 to 6 meq/g, preferably from 2 to 4 meq/g.

Step 4:

Usually the dispersion of the ethylenically unsaturated polymer (1) in water requires the preliminary neutralization of the acid groups provided by compound (a3) into salts. The acrylic polymer can e.g. be neutralized by reacting its acidic functionality with ammonia, with an organic amine or with an inorganic base. In this embodiment of the invention, the equivalent ratio of acidic functionality to the total amount of neutralizing agent is preferably from 1:1 to 1:0.5, more preferably from 1:1 to 1:0.9, most preferably 1:1. The neutralization reaction is being made either in the presence of a solvent or without any solvent. The reaction in the forth step may take place at temperatures between 20 to 150° C., preferably between 50 to 70° C. The reaction is carried out using either a one shot process or an incremental addition of the neutralizing agent over a certain period of time ranging from 5 to 15 minutes.

Step 5:

The ethylenically unsaturated (meth)acrylic polymer (1) is dispersed in water immediately after neutralization. For this purpose, the dispersion can be made using either a direct dispersion process or a phase inversion process. Usually the dispersion proceeds under high shear mixing and suitable mixing equipment like mixer, stirrer, anchor, propeller or cowless is used for that purpose. In the case of the direct dispersion, the neutralized ethylenically unsaturated polymer (1) is added into water during a period of 5 minutes to 4 hours, preferably of 20 minutes to 40 minutes. Alternatively, the ethylenically unsaturated polymer (1) is added into water containing a neutralizing agent. In the case of the phase inversion, water is added into the neutralized polymer during a period of 5 minutes to 4 hours, preferably of 20 minutes to 40 minutes. In this last case, the viscosity of the 'Water-in-oil' system is increasing typically to a maximum which is immediately followed by a drop of viscosity corresponding to the phase inversion and the formation of a 'oil-in-water' system. The temperature of the polymer before the dispersion is between 20° C. to 100° C., preferably between 50° C. to 70° C. and the temperature of the water is between 5° C. to 60° C., preferably between 20° C. to 40° C. Residual isocyanate groups that could still be present in the polymer mixture usually react with water during the dispersion step, generally forming an amine which can then further react to an urea while providing chain extension.

Step 6:

The polymer dispersion is usually stripped when it contains a volatile solvent with a boiling point of below 100° C. This is usually done under reduced pressure and/or with water vapor at a temperature between 20 and 90° C., preferably 40 to 60° C. until the residual solvent falls below 0.5% by weight of the water dispersion, preferably below 0.15% by weight of the water dispersion.

Step 7:

The dispersion can be formulated with any additive that could be required to preserve the dispersion or facilitate the processing or application of the dispersion onto a substrate by any means including brushing, dipping, spray coating, roller coating, gravure coating and curtain coating. The dispersion can also be formulated with any additive capable to enhance the adhesion on a specific substrate, to preserve the integrity of the coating during natural indoor or outdoor aging, to increase the mechanical or chemical resistance of the coating, to impart any desired surface properties to the coating or to modify the aspect, the color or the aesthetics of the coating. In a specific embodiment, the dispersion can be formulated with emulsifiers (3) in order to increase the colloidal stability of the dispersion.

Other compounds that may be added to the radiation curable aqueous composition of the invention have been described above.

Preferably compositions of the invention have a residual level of ethylenically unsaturated functions of between 0.1 and 6 meq/g, typically of between 1 and 6 meq/g, more typically of between 1 and 5 meq/g, more preferably of between 2 and 5 meq/g, even more preferably of between 2 and 4 meq/g, most preferably between 3 and 4 meq/g.

The compositions of the present invention advantageously provide dispersions with low volatile organic content (VOC), a high solids content, a low viscosity, a low particle size, an excellent colloidal stability and a low film formation temperature.

The compositions of the invention generally are tacky before cure, but the present invention permits to obtain compositions that have no tack before radiation curing.

The compositions of the invention generally have a solid content of from about 30% to 65% by weight, typically from 30% to 60% by weight. Preferably the solid content is at least 35% by weight and preferably at most 50% by weight, most preferably at most 45% by weight. The water content is typically from 35% to 70% by weight, preferably from 40% to 70% by weight, more preferably from 50% to 65% by weight, most preferably from 55% to 65% by weight. The viscosity measured at 25° C. generally ranges from 20 to 20,000 mPa·s. Preferably the viscosity measured at 25° C. is at least 50 and preferably at most 500 mPa·s. The pH value generally ranges from 5 to 11. Preferably the pH is at least 7 and preferably at most 9. The average particle size in general ranges from 10 to 1,000 nm. Preferably the average particles size is at least 50, more preferably at least 70 nm. Preferably the particles size is at most 300, more in particular at most 150 nm. The minimum film formation temperature (MFFT) preferably ranges from 0 to 90° C. Preferably the MFFT is at most 40° C., more in particular at most 20° C.

Preferred compositions of the invention have a solid content, a viscosity, a pH, average particle size and minimum film formation temperature as specified above.

The compositions of the invention are preferably cured by ultraviolet irradiation, generally in the presence of photoinitiator. Although the use of high energy ultraviolet lamps (typically 80 to 120 W/cm) is particularly suitable for rapid and efficient curing, it would also be possible to use low energy ultraviolet lamps active in the UV-A spectral region and including LED-type lamps (typically 0.001 to 16 W/cm$^2$) when the application requires specific conditions of usage. They can however also be cured by electron-beam irradiation, allowing the use of compositions free of photoinitiator. The compositions according to the invention are providing extremely rapid curing and show a high reactivity allowing rapid line speed or less irradiative curing energy associated with increased productivity and sustainability.

When presenting a level residual hydroxyl functionality, compositions of the invention may also be cured thermally in the presence of a suitable crosslinker.

The radiation curable aqueous compositions according to the invention permit to obtain coatings which, after radiation curing, show a good chemical resistance against water, solvents and stains combined with a good mechanical resistance against scratch and abrasion—while still being relatively flexible at ambient or low temperature. These coatings can cover many different application areas and also exhibit a good adhesion on porous and non-porous substrates and in particular treated or untreated, transparent or colored plastics including but not limited to polycarbonate, polystyrene, polymethylmethacrylate, ABS, PVC, PET, polyethylene, polypropylene or blends thereof. They can also be used to cover, for example, wood, glass, metal, concrete, textile and leather.

The compositions according to the invention are also suitable for making inks and overprint varnishes. Also adhesives can be made from the compositions of the invention.

Provided in the invention are as such coatings, inks or overprint varnishes, possibly adhesives prepared from a composition of the invention. Provided are also coatings, inks or overprint varnishes, possibly adhesives comprising a composition of the invention.

The present invention also relates to the use of a composition of the invention for making coatings, inks or varnishes. Equally provided is a process for making coatings, inks or varnishes from a composition of the invention.

The present invention also relates to a process for preparing a coated article comprising a step of applying a composition of the invention to at least one surface of an article, followed by a step of curing said coating composition by exposure to high energy radiation. Said step of radiation curing may, optionally, be followed by a step of thermal curing in the presence of an optional crosslinker.

More in particular there is provided a method of coating an article with a composition of the invention, comprising the steps of: applying such a composition to at least one surface of an article in the form of a wet film, drying or flushing off at least a part of the water comprised in the said film, and curing the film by exposure to high energy radiation, optionally followed by a step of thermal curing in the presence of a crosslinker.

A further object of the invention is an article coated, either entirely or partially, with a composition of the invention. In particular, 3-dimensional objects where some parts could be less or even not irradiated fall in the frame of the invention.

The present invention is further illustrated by the following and non-limiting examples.

EXAMPLE 1

Synthesis of a Water-Dispersible (Meth)Acrylic Polymer A

A double-wall glass reactor is charged with 211.4 g of methylethylketone (MEK) and heated to a temperature of 60° C. under an agitation of 100 rpm. A mixture (I) of 398.25 g methylmethacrylate (MMA), 285.75 g butylacrylate (BuA), 37.5 g of hydroxyethylacrylate (HEA), 37.5 g of methacrylic acid (MAA) and 22.5 g of n-dodecylmercaptan (DDM) is prepared and charged into a dropping funnel (I) connected to the reactor via a peristaltic pump. A mixture (II) of 35.23 g of methylethylketone (MEK) and 5.62 g of 2,2'-azobis(2,4-dimethylpentanenitrile) (VAZO®52) is prepared separately and charged into a second dropping funnel (II) connected to the reactor via a peristaltic pump. The content of the addition funnel (I) is transferred into the reactor over a period of 4 hours (60% during the first 2 hours and 40% during the last 2 hours) while the content of the addition funnel (II) is transferred in parallel at a constant flow rate over the same period of 4 hours. The addition is followed by another period of 30 minutes at 60° C. Another mixture (III) of 17.61 g of methylethylketone (MEK) and 2.81 g of 2,2'-azobis(2,4-dimethylpentanenitrile) (V52) is then added in one portion into the reactor. The temperature is subsequently increased to reflux (ca 80-85° C.) for another 2.5 hour. The polymer solution is then cooled below 25° C. and drummed of the reactor. It has a solid content 75%, a viscosity of 25,000 mPa·s at 25° C., a level of free monomers of 0.5%, a number-average molecular weight (Mn) of 5,200 Daltons and a weight-average molecular weight (Mw) of 12,800 Daltons.

Synthesis of a Polyethylenically Unsaturated Compound B:

A double-wall reactor is charged with 44.55 g of hexamethylene diisocyanate (HDI) and 0.14 g of dibutyltin dilaurate (DBTL). It is heated at a temperature of 50° C. under an agitation of 100 rpm and air flow is introduced at a rate of 1 L/kg/hour during all the urethanization process. 357.94 g of polyacrylated dipentaerythrytol (DPHA) with an IOH value between 45-60 mgKOH/g, corresponding to a mixture containing essentially dipentaerythritol tetraacrylate, dipentaerythritol pentaacrylate and dipentaerythritol hexaacrylate) is added to the reactor over a period of 4 hours while keeping the temperature at 50° C. The reaction is kept over another 4 hours at 50° C. until the I[NCO] drops down below 0.59 meq/g. The isocyanate content can be followed by back-titration of residual dibutylamine with chlorhydric acid. The reactive adduct is then cooled below 25° C. and drummed of the reactor. It has a viscosity of 40,000 mPa·s at 25° C.

Synthesis of the Acrylated Acrylic Polymer Dispersion in Water:

A double-wall reactor is charged at room temperature with 1054.18 g of the acrylic polymer solution (A) and with 402.5 g of polyacrylated dipentaerythrytol adduct (B) and corresponding to 30% in weight of the polyacrylate over the acrylic polymer (A). 0.60 g of 4-methoxyhydroquinone (MEHQ) and 0.60 g of 2,6-di-tert-butyl-4-methylphenol (BHT) are added in one shot into the reactor. The mixture is stirred at a speed of 100 rpm, air flow is introduced at a rate of 1 L/kg/hour and the temperature is increased to reflux (ca. 85° C.). The reaction is followed over a period of 8 hours until the I[NCO] drops down to 0 meq/g or shows a plateau corresponding to a decrease of I[NCO] of less than 0.01 meq/g per ½ hour. The isocyanate content can be followed by titration with an amine. The temperature is cooled down to 50° C. and 45 g of triethylamine (TEA) is added to the reactor and stirred for another ¼ hour. The content of the reactor is then transferred over a period of ¼ hour in a dispersion vessel filled with 2215 g of water at ambient temperature and stirred with a cowless mixer turning at an agitation speed of 500 rpm. The polymer dispersion is transferred to the double-wall reactor and heated at a temperature of 50° C. The methylethylketone (MEK) is stripped under a vacuum of −0.95 bar until the final polymer dispersion has a free solvent content of max. 0.15%. It is eventually diluted with additional water to reach a solid content of 35%. The product has a Brookfield viscosity of 60 mPa·s, a pH of 8.2, a mean particle size of 67 nm and a grits content of 42 mg/L. The colloidal stability of the dispersion is superior to 10 days at 60° C. The minimum film formation temperature is below 0° C.

Other polymers have been prepared following the procedure outlined for Example 1 but for some modifications in the polymer composition. The polymer composition of Examples 1-11 and of comparative Example R12 is provided in Table 1. The characterization of acrylated acrylic polymers in solvent is outlined in Table 2. The characterization of acrylated acrylic polymer dispersions is outlined in Table 3. The performance of the cured coating is outlined in Table 4. Below a Summary of the Major Modifications in the Composition:

The polymer of Example 1 has a theoretical glass transition temperature (Tg) of 20° C. as calculated by using the Fox equation. The acrylic polymers of Examples 2 and 3 have a glass transition temperature of 35° C. and 5° C. respectively. In Example 4, the polyacrylate adduct is made from hexamethylenediisocyanate (HDI) and pentaerythrytol triacrylate (PETIA). In Example 5 the level of hydroxyethylacrylate (HEA) in the acrylic polymer is increased by 10% by weight. In Example 6, HEA is replaced with polyethyleneglycol (6) monomethacrylate (HEM6). In Example 7 methacrylic acid is replaced by vinyl sulfonic acid. In Example 8 the neutralizing agent triethylamine (TEA) is replaced with sodium hydroxide (30%). Example 9 reflects the incorporation of an adhesion promoter EBECRYL®430 at a level of 5% based on the weight of the unsaturated acrylic polymer (1) and prior to neutralization and dispersion with water. Example 10 reflects the incorporation of ureidoethylmethacrylate (UEM) at a level of 5% based on the weight of the acrylic polymer (1). Example 11 describes the synthesis of an acrylic polymer containing alpha,alpha-dimethyl-m-isopropenylbenzyl isocyanate (TMI®, Cytec) which is being subsequently grafted with polyacrylated dipentaerythrytol (DPHA) with an IOH value between 60-75 mgKOH/g, then neutralized with triethylamine (TEA) and dispersed in water.

Comparative example 12R is similar to the Example 1 with the flowing exception: the polyacrylated dipentaerythrytol (DPHA) has been used at the same level based on the weight of the acrylic polymer but has not been grafted to it by the use of hexamethylenediisocyanate (HDI).

To evaluate the radiation curable aqueous compositions of the invention the following procedures and test methods were used.

The solid content was measured by a gravimetric method involving the dispersion drying during 2 h at 120° C. The viscosity of the dispersion was measured at 25° C. with a Brookfield viscometer using spindle N° 1 at 50 rpm. The average particle size of the aqueous polymer dispersion was measured by laser light scattering using a Malvern Autosizer Lo-C single angle particle analyzer. The grits content of the dispersion, that is the amount of residue from the polymer dispersion filtered on a 50µ sieve, was measured by gravimetry. The minimum film formation temperature (MFFT) of the dispersion was measured after application of the polymer dispersion on a gradient-heated metallic bar according to the standard method ISO 2115: 1996.

The colloidal stability was assessed by observing the decantation and/or phase separation on a 50 g sample placed in an oven at 60° C. for a recorded number of days. Alternatively, the colloidal stability is followed by multiple light scattering at 60° C. (Turbiscan® equipment).

The molecular weight of the polymers is measured by gel permeation chromatography (GPC). Therefore, a small portion of the unsaturated acrylic dispersion is dissolved in tetrahydrofuran (THF) and injected into the chromatography column after a preliminary filtration. The components of the sample are eluted with the mobile phase solvent (THF) at a flow rate of 1 ml/min and separated by a combination of polystyrene-divinylbenzene columns at a temperature of 40° C. Polystyrene standards with known molecular weight and narrow polydispersity are used to generate the calibration curve.

The hydroxyl number (IOH) of the intermediates, oligomers & polymers is expressed in mg KOH per gram. It is typically measured by derivatisation of the hydroxyl function with a reactant. ASTM E1899-08 is based on the reaction of primary and secondary hydroxyls with an excess of toluene-4-sulfonyl-isocyanate (TSI) to form an acidic carbamate that can be titrated in a non-aqueous medium with the strong base tetrabutyl-ammonium-hydroxide (TBAOH). DIN 53240-2 is based on the catalysed reaction of primary and secondary hydroxyls with an excess of acetic anhydride and the subsequent titration of acetic acid with an alcoholic solution of potassium hydroxide in non aqueous medium.

The amount of ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrrolidinone. The sample is submitted to 1H-NMR analysis in order to measure the molar concentration of ethylenically unsaturated groups using 1,3,5-bromobenzene as internal standard. The comparison between the peak assigned to aromatic protons of the internal standard and the peaks assigned to the ethylenically unsaturated double bonds permits the calculation of the molar concentration of ethylenically unsaturated groups according to the formula (A×B)/C wherein A is the integration of 1H double bonds provided by the sample, B is the number of moles of the internal standard in the sample and C is the integration of 1H provided by the internal standard. Alternatively, the amount of ethylenically unsaturated groups can also be measured by a titration method following the addition of an excess of pyridinium sulfate dibromide on said unsaturated groups (within glacial acetic acid as solvent and mercury acetate as catalyst). The excess of reactant liberates iodine in the presence of potassium iodide and the iodine is then titrated with sodium thiosulfate.

The level of allophanate functionality is theoretically calculated by the secondary reaction of isocyanates with urethanes after the completion of the primary urethanization reaction.

The conversion of the curing reaction was provided by the Reacted Acrylic Unsaturation (RAU) level. The radiation cured film was analyzed by FTIR spectroscopy in attenuated total reflection mode. The ratio between the absorbance of the acrylic unsaturation band ($810\ cm^{-1}$) to the absorbance of an internal reference band ($842\ cm^{-1}$) calculated for the cured film and for the corresponding uncured liquid sample determines the degree of cure (%).

The polymer dispersion was formulated with 1.5 parts of a photo-initiator (ADDITOL® BCPK) and adjusted to a Brookfield viscosity between 1000 and 1500 mPa·s with the aid of a rheology modifier (UCECOAT® 8460/water 1:1). The viscosity of the formulated composition was recorded at equilibrium. Usually, 1.5 parts of the rheology modifier are used to reach the specified viscosity.

The formulated composition was applied on LENETA® paper with a wet thickness of 50µ using a Meyer bar and dried in an oven at 50° C. for 5 minutes The radiation curing was realized using a Mercury ultra-violet light of 80 W/cm at a conveyer speed of 5 meters per minute. The coated papers were conditioned during 24 hours at ambient temperature and evaluated for solvent resistance (using acetone double rubs) and scratch resistance (using steel wool double rubs) such as specified here below.

The formulated composition was applied on plastic substrates with a wet thickness of 30μ using a Meyer bar and dried in an oven at 50° C. for 5 minutes The radiation curing was realized using a Mercury ultra-violet light of 80 W/cm at a conveyer speed of 5 meters per minute. The coated plastics were conditioned during 24 hours at ambient temperature and evaluated for adhesion such as specified here below.

The formulated composition (without photo-initiator) was applied on glass with a wet thickness of 30μ or 150μ using a Meyer bar and dried in an oven at 50° C. for 5 minutes. The radiation curing was realized with electron beam (5 MRad, 250 keV). The coated glass was conditioned during 24 hours at ambient temperature and evaluated for Persoz hardness such as specified here below. The solvent resistance is assessed with acetone double rubs (ADR) by pressing a cotton rag saturated with acetone with a backward and forward motion on the coated surface; one double rub is equal to a backward and forward stroke on the coated surface. The reported number is the number of double rubs required to break through the coating. A high solvent resistance (more than hundred acetone double rubs) is necessary to ensure a good protection of the coating and the substrate against any household or industrial product spillage.

The scratch resistance (SR) is assessed by pressing steel wool on the coating with a backward and forward motion; one double rub is equal to a backward and forward stroke on the coated surface. The reported number is the surface damage on the coating (0-5, 0=best) recorded after 5 double rubs. A high scratch resistance is necessary to ensure a good mechanical protection and aesthetics of the coating and the substrate against any aggressive household or industrial manipulations.

The adhesion (ADH) is assessed using a cross hatch test with 5 cuts of ~1 cm long and spaced by ~1 mm are made in the coating using a knife, followed by 5 similar cuts in the transversal direction. The adhesion was measured using an adhesive tape (Scotch®) firmly pressed on the cross-cut coating and removed rapidly; the damage to the cross-cut surface area of the coating due to adhesion loss is expressed in a 0-5 scale, 0=best. A high adhesion is necessary to ensure a strong permanent bond between the coating and the substrate.

The pendulum hardness (Persoz) measures the time (in seconds) for a pendulum with a given weight and geometry to amortize its oscillation amplitude between 2 defined angles. It is measured on 3 places of the coating surface and the mean value is calculated. Elevated values are indicative of hard coatings. It follows ASTM D4466.

The Erichsen hardness is a common method for the measurement of the hardness of protective coatings. The estimated or known spring tension on the instrument (Model 318) is set with the help of a slider. Holding the instrument upright and placing its point (Bosch, 0.75 mm) on the test substrate, one draws a 5 to 10 mm long line at a rate of approximately 10 mm/sec. The stylus should produce a scratch which is just visible with the naked eye. If the spring pressure is too high, the scratch is clearly visible; if it is too low, no scratch appears. The coating hardness corresponds to the applied pressure (in Newtons) leading to the apparition of a first scratch of the coating. A high hardness is expected to provide the best protection against any storehouse or household mechanical deterioration.

The black marker stain resistance is assessed about 24 hours after curing of the coating. A stain is made with the black marker (alcohol type, Artline™) and washed after 5 minutes at ambient temperature using a tissue saturated with isopropanol. The results are rated visually and recorded in a 1-5 scale: 5=no stain; 4=very light stain; 3=moderate stain; 2=strong stain; 1=very strong stain. A high value (5) is expected to provide the best protection against any household product spillage.

The coffee stain resistance is assessed about 24 hours after curing of the coating. A solution of 4% Nescafe™ in water at 98° C. is prepared and cooled down to room temperature. A glass micro fiber filter saturated with coffee is put on the coating for 16 hours and then the stain is washed with water. The results are rated visually and recorded in a dual 1-5 scale: 5=no stain; 4=very light stain; 3=moderate stain; 2=strong stain; 1=very strong stain and 5=no deterioration; 4=very light deterioration; 3=moderate deterioration; 2=strong deterioration; 1=very strong deterioration. A high value (5) is expected to provide the best protection against any household product spillage.

TABLE 1 composition of acrylated acrylic polymers (1) expressed in g

| | EX1 | EX2 | EX3 | EX4 | EX5 | EX6 | EX7 | EX8 | EX9 | EX10 | EX11 | EX12R |
|---|---|---|---|---|---|---|---|---|---|---|---|---|
| MEK | 264.2 | 264.2 | 264.2 | 264.2 | 264.2 | 264.2 | 264.2 | 264.2 | 297.2 | 264.2 | 276.0 | 264.2 |
| MMA | 398.2 | 295.4 | 435.3 | 398.2 | 341.2 | 337.5 | 392.3 | 398.2 | 398.2 | 200.7 | 419.7 | 419.7 |
| BuA | 285.7 | 388.6 | 248.7 | 285.7 | 255.0 | 240.0 | 282.0 | 285.7 | 285.7 | 285.7 | 301.2 | 301.2 |
| HEA | 37.5 | 37.5 | 37.5 | 37.5 | 112.5 | — | 37.5 | 37.5 | 37.5 | 37.5 | — | — |
| HEM6 | — | — | — | — | — | 113.25 | — | — | — | — | — | — |
| UEM Norsocryl 102 | — | — | — | — | — | — | — | — | — | 197.5 | — | — |
| MAA | 37.5 | 37.5 | 37.5 | 37.5 | 37.5 | 37.5 | — | 37.5 | 37.5 | 37.5 | 36.0 | 36.0 |
| VPA | — | — | — | — | — | — | 47.2 | — | — | — | — | — |
| DDM | 22.5 | 22.5 | 22.5 | 22.5 | 22.5 | 22.5 | 22.5 | 22.5 | 22.5 | 22.5 | 22.5 | 22.5 |
| V52[1] | 5.6 | 5.6 | 5.6 | 5.6 | 5.6 | 5.6 | 5.6 | 5.6 | 5.6 | 5.6 | 7.5 | 7.5 |
| V52[2] | 2.8 | 2.8 | 2.8 | 2.8 | 2.8 | 2.8 | 2.8 | 2.8 | 2.8 | 2.8 | 3.7 | 3.7 |
| DBTL | 0.14 | 0.14 | 0.14 | 0.14 | 0.14 | 0.14 | 0.14 | 0.14 | 0.14 | 0.14 | 0.14 | — |
| HDI | 44.5 | 44.5 | 44.5 | 128.7 | 44.5 | 44.5 | 44.5 | 44.5 | 44.5 | 44.5 | — | — |
| TMI | — | — | — | — | — | — | — | — | — | — | 37.5 | — |
| DPHA | 357.9 | 357.9 | 357.9 | — | 357.9 | 357.9 | 357.9 | 357.9 | 357.9 | 357.9 | 354.9 | 338.9 |
| PETIA | — | — | — | 394.0 | — | — | — | — | — | — | — | — |
| MEHQ | 0.6 | 0.6 | 0.6 | 0.6 | 0.6 | 0.6 | 0.6 | 0.6 | 0.6 | 0.6 | 1.2 | 1.2 |
| BHT | 0.6 | 0.6 | 0.6 | 0.6 | 0.6 | 0.6 | 0.6 | 0.6 | 0.6 | 0.6 | 1.2 | 1.2 |
| EB430 | — | — | — | — | — | — | — | — | 132.5 | — | — | — |
| TEA | 44.0 | 44.0 | 44.0 | 44.0 | 44.0 | 44.0 | 44.0 | — | 44.0 | 44.0 | 42.2 | 42.2 |
| NaOH | — | — | — | — | — | — | — | 58.1 | — | — | — | — |
| Water | 2215 | 2215 | 2215 | 2215 | 2160 | 2217 | 2215 | 2462 | 2215 | 2199 | 2099 | |

TABLE 2 characterization of acrylated acrylic polymer (1) in MEK

| | EX1 | EX2 | EX3 | EX4 | EX5 | EX6 | EX7 | EX8 | EX9 | EX10 | EX11 | EX12R |
|---|---|---|---|---|---|---|---|---|---|---|---|---|
| η, .polymer# (mPa·s) | 21200 | 26480 | 26480 | 21200 | 31620 | 27480 | 17420 | 26480 | 26480 | 23400 | 35657 | 22340 |
| Free monomers, polymer# (%) | 0.52 | 1.1 | 1.1 | 0.52 | 0.49 | 0.35 | 1.0 | 1.1 | 1.1 | 0.8 | 3.0 | 0.89 |
| Mn (Dalton) | 5240 | 5330 | 5370 | 5240 | 6460 | 6410 | 3000 | 5330 | 5330 | 6250 | 6120 | 5260 |
| Mw (Daltons) | 12800 | 14400 | 14900 | 12800 | 14600 | 28700 | 9160 | 14400 | 14400 | 15900 | 39200 | 11800 |
| I[OH] acrylate (mgKOH/g) | 52.6 | 52.6 | 52.6 | 120.0 | 52.6 | 52.6 | 52.6 | 52.6 | 52.6 | 52.6 | 52.6 | 52.6 |
| I[NCO] adduct (meq/g) | 0.52 | 0.48 | 0.48 | 1.32 | 0.46 | 0.46 | 0.46 | 0.46 | 0.46 | 0.48 | NA | NA |
| I[NCO] polymer# (meq/g) | 0.03 | 0.01 | 0.02 | 0.02 | 0.02 | 0.00 | 0.02 | 0.01 | 0.02 | 0.03 | 0.07 | NA |

TABLE 3 characterization of acrylated acrylic polymer dispersions

| | EX1 | EX2 | EX3 | EX4 | EX5 | EX6 | EX7 | EX8 | EX9 | EX10 | EX11 | EX12R |
|---|---|---|---|---|---|---|---|---|---|---|---|---|
| Solids (%) | 35.0 | 35.0 | 35.0 | 35.0 | 34.5 | 34.5 | 35.0 | 35.0 | 35.0 | 34.7 | 35.0 | 35.0 |
| Viscosity (mPa·s) | 60 | 58 | 52 | 67 | 4530 | 256 | 50 | 40 | 82 | 86 | 74 | 76 |
| pH | 8.2 | 8.5 | 8.5 | 7.9 | 8.5 | 8.4 | 8.5 | 8.7 | 7.6 | 7.8 | 8.2 | 8.2 |
| Particles (nm) | 67 | 62 | 102 | 82 | 53 | 56 | 190 | 263 | 98 | 87 | 152 | 77 |
| Grits (mg/L) | 42 | 20 | 26 | 1 | 38 | 17 | 20 | 25 | 37 | 20 | | 100 |
| Stability 60° C. (d) | >10 | >10 | >10 | >10 | >10 | >10 | >11 | >10 | | >11 | 3 | 4 |
| Tack b/cure (Y/N) | Y | Y | Y | Y | Y | Y | N | Y | Y | Y | Y | Y |
| MFFT (° C.) | <0 | <0 | <0 | <0 | <0 | <0 | <0 | <0 | <0 | <0 | <0 | <0 |

TABLE 4 performance of acrylated acrylic polymer dispersions;

| | EX1 | EX2 | EX3 | EX4 | EX5 | EX6 | EX7 | EX8 | EX9 | EX10 | EX11 | EX12R |
|---|---|---|---|---|---|---|---|---|---|---|---|---|
| ADR[1] | 100+ | 100+ | 100+ | 100+ | 100+ | 100+ | 100+ | 100+ | 100+ | 100+ | 100+ | 5 |
| Scratch resistance[2] | 3 | 3 | 3 | 3 | 3 | 3 | 3 | 3 | 3 | 3 | 4 | 5 |
| Stain[4], coffee | 0 | 0 | 0 | 0 | 0 | 0 | 0 | 0 | 0 | 0 | 0 | 0 |
| Stain[4], N70 marker | 0 | 0 | 0 | 0 | 0 | 0 | 0 | 0 | 0 | 5 | 0 | 0 |
| ADH[3], PC | 0 | 0 | 0 | 0 | 0 | 0 | 0 | 0 | 0 | 5 | 0 | 3 |
| ADH[3], PS | 0 | 5 | 0 | 0 | 5 | 5 | 0 | 0 | 5 | 5 | 3 | 5 |
| ADH[3], PMMA | 0 | 0 | 0 | 0 | 0 | 0 | 0 | 0 | 2 | 5 | 0 | 3 |
| ADH[3], ABS | 0 | 0 | 0 | 0 | 0 | 5 | 0 | 0 | 5 | 5 | 0 | 5 |
| ADH[3], ABS black | 0 | 0 | 2 | 0 | 5 | 5 | 0 | 0 | 5 | 5 | 5 | 5 |
| ADH[3], ABS silver | 0 | 5 | 5 | 0 | 5 | 5 | 0 | 0 | 5 | 5 | 5 | 5 |
| ADH[3], PVC | 0 | 0 | 0 | 0 | 0 | 0 | 0 | 0 | 4 | 5 | 0 | 0 |
| ADH[3], PVC gray | 0 | 0 | 2-3 | 0 | 0 | 5 | 0 | 0 | 4 | 5 | 0 | 3 |
| ADH[3], PET | 0 | 0 | 0 | 0 | 0 | 0 | 0 | 0 | 0 | 5 | 0 | 3 |
| ADH[3], PE corona | 5 | 5 | 5 | 5 | 5 | 5 | 3 | 5 | 5 | 5 | 5 | 5 |
| ADH[3], PP corona | 5 | 5 | 5 | 5 | 5 | 5 | 5 | 5 | 5 | 5 | 5 | 5 |
| ADH[3], glass | 5 | 5 | 5 | 5 | 5 | 5 | 0 | 5 | 5 | 5 | 5 | 5 |
| Persoz hardness, s | 186 | 71 | 79 | 187 | 214 | 241 | 125 | 168 | 99 | 81 | 65 | 55 |
| RAU, % | 59 | 69 | 64 | 63 | 70 | 74 | 72 | 62 | 65 | 71 | 69 | 66 |

[1] Acetone Double Rubs on Leneta paper
[2] Steel Wool Scratch Resistance (0-5, 0 = good)
[3] Cross hatch adhesion (0-5, 0 = good)
[4] Stain resistance, coffee (contact 16H) and black marker (contact 5 minutes) (0-5, 0 = good)

EXAMPLE 13

Synthesis of an Acrylated Acrylic Dispersion Made with a Mono-Acrylated Adduct Obtained from the Reaction Between H12MDI and HEA Synthesis of a Water-Dispersible (Meth)Acrylic Polymer A:

A double-wall glass reactor is charged with 211.4 g of methylethylketone (MEK) and heated to a temperature of 60° C. under an agitation of 100 rpm. A mixture (I) of 398.25 g methylmethacrylate (MMA), 285.75 g butylacrylate (BuA), 37.5 g of hydroxyethylacrylate (HEA), 37.5 g of methacrylic acid (MAA) and 22.5 g of n-dodecylmercaptan (DDM) is prepared and charged into a dropping funnel (I) connected to the reactor via a peristaltic pump. A mixture (II) of 35.23 g of methylethylketone (MEK) and 5.62 g of 2,2'-azobis(2,4-dimethylpentanenitrile) (VAZO®52) is prepared separately and charged into a second dropping funnel (II) connected to the reactor via a peristaltic pump. The content of the addition funnel (I) is transferred into the reactor over a period of 6 hours at constant flow rate while the content of the addition funnel (II) is transferred in parallel at a constant flow rate over the same period of 6 hours. The addition is followed by another period of 30 minutes at 60° C. Another mixture (III) of 17.61 g of methylethylketone (MEK) and 2.81 g of 2,2'-azobis(2,4-dimethylpentanenitrile) (V52) is then added drop wise into the reactor during 15 minutes. The temperature is subsequently increased to reflux (ca 85° C.) for another 2.5 hour. The polymer solution is then cooled below 25° C. and drummed of the reactor. It has a solid content 75%, a viscosity of 25,000 mPa·s at 25° C., a level of free monomers of 0.5%, a number-average molecular weight (Mn) of 6100 Daltons and a weight-average molecular weight (Mw) of 16200 Daltons.

Synthesis of a Polyethylenically Unsaturated Compound B:

A double-wall reactor is charged with 44.55 g of hexamethylene diisocyanate (H12MDI) and 0.03 g of dibutyltin dilaurate (DBTL). It is heated at a temperature of 50° C. under an agitation of 100 rpm and air flow is introduced at a rate of 1 L/kg/hour during all the urethanization process. 21.67 g of hydroxyethylacrylate (HEA) is added to the reactor over a period of 6 hours while keeping the temperature at 50° C. The reaction is kept over another 2 hours at 50° C. until the I[NCO] drops down below 2.00 meq/g. The isocyanate content can be followed by back-titration of residual dibutylamine (0.5N) in N-Methylpyrolydone with chlorhydric acid (0.1N) in 2-propanol. The reactive adduct is then cooled below 25° C. and drummed of the reactor. It has a viscosity of 120,000 mPa·s at 25° C.

Synthesis of the Acrylated Acrylic Polymer Dispersion in Water:

A double-wall reactor is charged at room temperature with 856 g of the acrylic polymer solution (A) and with 66.2 g of H12MDI-HEA adduct (B) and corresponding to the same NCO equivalent content compared to example 1. 0.86 g of 2,6-di-tert-butyl-4-methylphenol (BHT) are added in one shot into the reactor. The mixture is stirred at a speed of 100 rpm, air flow is introduced at a rate of 1 L/kg/hour and the temperature is increased to reflux (ca. 85° C.). The reaction is followed over a period of 8 hours until the I[NCO] drops down to 0 meq/g or shows a plateau corresponding to a decrease of I[NCO] of less than 0.01 meq/g per ½ hour. The isocyanate content can be followed by titration with an amine. The temperature is cooled down to 50° C. and 34 g of triethylamine (TEA), is added to the reactor and stirred for another ¼ hour. This quantity, corresponds to the same number of eq/g of prepolymer compared to example 1. The content of the reactor is then transferred over a period of ¼ hour in a dispersion vessel filled with 1589.7 g of water at ambient temperature and stirred with a cowless mixer turning at an agitation speed of 500 rpm. The polymer dispersion is transferred to the double-wall reactor and heated at a temperature of 50° C. The methylethylketone (MEK) is stripped under a vacuum of −0.95 bar until the final polymer dispersion has a free solvent content of max. 0.15%. It is eventually diluted with additional water to reach a solid content of 35%. The product has a Brookfield viscosity >10000 mPa·s, a pH between 7.0 and 8.5, a mean particle size of 59 nm and a grits content >100 mg/L. The colloidal stability of the dispersion is superior to 10 days at 60° C. The minimum film formation temperature is 0° C.

Composition and characteristics of the polymer (1) and its dispersion in water are given in Tables 5 to 8 below.

TABLE 5 composition of the acrylated acrylic polymer (1) expressed in g

|  | EX13 |
|---|---|
| MEK | 264.2 |
| MMA | 398.2 |
| BuA | 285.7 |
| HEA | 37.5 |
| MAA | 37.5 |
| DDM | 22.5 |
| V52 [(1)] | 5.6 |
| V52 [(2)] | 2.8 |
| DBTL | 0.03 |
| HDI | 44.5 |
| HEA | 21.67 |
| BHT | 0.86 |
| TEA | 34.1 |
| Water | 1589.7 |

TABLE 6 characterization of the acrylated acrylic polymer (1) in MEK

|  | EX13 |
|---|---|
| Solids (%) | 75 |
| η (mPa · s) | 7840 |
| Free monomers (%) | 0.66 |
| Mn (Dalton) | 6100 |
| Mw (Daltons) | 16200 |
| I[OH] acrylate (mgKOH/g) | 483.6 |
| I[NCO] adduct (meq/g) | 1.98 |
| I[NCO] polymer[#] (meq/g) | 0 |

TABLE 7 characterization of the acrylated acrylic polymer dispersion

|  | EX 13 |
|---|---|
| Solids (%) | 33.8 |
| Viscosity (mPa · s) | 11360 |
| pH | 7.02 |
| Particles (nm) | 59 |
| Grits (mg/L) | >100 |
| Stability 60° C. (d) | >10 |
| Tack b/cure (Y/N) | N |
| MFFT (° C.) | 0 |

TABLE 8 performance of acrylated acrylic polymer dispersion

|  | Ex13 |
|---|---|
| ADR[(1)] | <5 |
| Scratch resistance[(2)] | 1 |
| Stain[(4)], coffee | 4 |
| Stain[(4)], N70 marker | 4 |
| Stain[(4)], mustard | 2 |
| Stain[(4)], eosin | 4 |
| ADH[(3)], PC | 0 |
| ADH[(3)], PS | 5 |
| ADH[(3)], PMMA | 0 |
| ADH[(3)], ABS | 5 |
| ADH[(3)], ABS black | 5 |
| ADH[(3)], ABS silver | 5 |
| ADH[(3)], PVC | 0 |
| ADH[(3)], PVC gray | 3 |

TABLE 8-continued performance of acrylated acrylic polymer dispersion

| | Ex13 |
|---|---|
| ADH[(3)], PET | 0 |
| ADH[(3)], PE corona | 5 |
| ADH[(3)], PP corona | 5 |
| ADH[(3)], glass | 5 |
| Persoz hardness, s | 153 |
| RAU, % | 65 |

Performance and Characteristics of Mono-Acrylated Adducts Versus Poly-Acrylated Adducts:

The above results demonstrate the beneficial effect of using a poly-acrylated adduct in comparison to (only) a mono-acrylated adduct. This follows amongst others from the following observations:

Example 13 is providing a dispersion at 35% solids with a much higher viscosity and a higher grit content (see Table 8) compared to compositions of this invention wherein a poly-acrylated adduct was used The performance of the cured coating made from Example 13 is much weaker than that of the other compositions of the invention. For instance the chemical & mechanical resistances, in particular the acetone double rubs (ADR) and the scratch resistance were less good (see Table 8 versus Table 4)

Surprisingly, the grafting of a poly-acrylated adduct (in comparison with a mono-acrylated adduct) at the same functional stoechiometry not only results in a beneficial reduction of the weight fraction of the diisocyanate component (and hence of the weight fraction of the urethane functionality in the polymer), but also results in an overall improvement of the polymer dispersion (viscosity, grits) and of the cured coated film (chemical & mechanical resistance)

Synthesis of Mono-Acrylated Adducts Versus Poly-Acrylated Adducts:

All the examples of adducts (A-D) have been made according to the previously described process using 500 ppm of DBTL and a 4 hours delayed feeding of the hydroxyethyl acrylate (HEA) in the diisocyanate at a temperature of 50° C. The specific stoechiometry used in these examples is indicated in the table. There was no attempt to decrease the I[NCO] below the target by creating additional allophanates because of the premature viscosity increase of the reaction mixture. The results in Table 9 below show that with a similar stoechiometry the polymer(s) (1) prepared from a mono-acrylate adduct are more prone to gellification and thus more difficult to produce.

From the data presented in Table 9 the following can be concluded:

The different mono-acrylated adducts obtained by the reaction between IPDI, H12MDI or HDI with hydroxyethyl acrylate (HEA) are providing extremely viscous and heterogeneous adducts, that are as such not so easy to handle (compared to poly-acrylated adducts, see below).

The viscosity of the adduct is increasing when switching from IPDI (lowest) to H12MDI (medium) and to HDI (highest); the viscosity is essentially climbing at the end of the reaction and in general does not permit to generate additional allophanate functionality.

The use of an adduct stoechiometry of e.g. 50% instead of 55% does not permit to decrease the viscosity of the reaction product.

All these adducts have a low stability as shown by the chance on gellification of the products during aging for 20 days at 40° C.

TABLE 9

| | | EX. A | EX. B | EX. C | EX. D |
|---|---|---|---|---|---|
| Composition | | IPDI-HEA | H12MDI-HEA | HDI-HEA | HDI-HEA |
| Stoechiometry | | 55 | 55 | 55 | 50 |
| INCO (theoretical) | meq/g | 2.57 | 2.31 | 3.04 | 3.52 |
| INCO (measured) | meq/g | 2.51 | 2.32 | 2.96 | 3.04 |
| Aspect | | Yellow viscous liquid | White paste | White paste | White paste |
| η (MCR) 25° C. | mPa · s | 17,213 | 114,160 | N/A | N/A |
| Free diisocyanate | % | (gelified) | — | — | — |
| Free HEA NCO content | ppm | (gelified) | <50 | — | — |
| after 20 days aging @40° C. | meq/g | (gelified) | (gelified) | (gelified) | (gelified) |

EXAMPLES 1a-1f

Synthesis of Poly-Acrylated Adducts from the Reaction of HDI with DPHA

The data below show the benefit of having a certain percentage of allophanate groups, and thereby reducing the amount of diisocyanates or polyisocyanate adducts in the composition. The IOH of the polyacrylate molecule, the stoechiometry used and the level of allophanate groups allow the person skilled in the art to keep the viscosity of the grafted polymer solution within the desired range.

TABLE 10 viscosity of the grafted polymer solution and characteristics of the dispersions obtained with the process conditions of Example 1 with a stoechiometry of 55% but using an adduct made (i) with DPHA at a lower/higher IOH and (ii) with/without excess of allophanates (0-10-20%)

| EX. | IOH DPHA mgKOH/g | % allophanate | η 80° C. polymer (mPa · s) | Solids (%) | η (mPa · s) | pH | PS (nm) | Stability 60° C. (days) |
|---|---|---|---|---|---|---|---|---|
| 1a | 45 | 0 | 1520 | 35 | 98 | 8.4 | 70 | >11 |
| 1b | 45 | 10 | 1210 | 35 | 74 | 8.5 | 82 | >11 |
| 1c | 45 | 20 | 1050 | 35 | 68 | 8.6 | 91 | >11 |
| 1d | 68 | 0 | (gel) | 35 | — | — | — | — |
| 1e | 68 | 10 | 15000 | 35 | — | — | — | — |
| 1f | 68 | 20 | 8100 | 35 | 76 | 8.4 | 86 | >10 |

The viscosity of the grafted polymer solution is linked to the IOH of the polyacrylate molecule (DPHA) and the % of additional allophanates created in excess of the original stoechiometry A low IOH (45-60 mg KOH/g) for the poly-acrylated molecule used in the adduct results in a low grafted polymer solution viscosity and conform dispersion characteristics; it is possible to see an impact of the increasing % of allophanates on the particle size and the viscosity of the dispersion A high IOH (60-75 mg KOH/g) for the poly-acrylated molecule used in the adduct can result in a high grafted polymer solution viscosity which is predominant at low % of allophanates and decreasing linearly at higher % of allophanates. In such case it is desirable to have a higher percentage of allophanates as this will allow to obtain conform dispersion characteristics with a colloidal stability superior to 10 days at 60° C.

EXAMPLES 1g-1i

The Grafting of the Acrylic Polymer with the Adduct (HDI-DPHA) in the Presence of Increasing Amount of Free Thermal Radical Initiator (VAZO 52)

The data below show the beneficial effect of using a free thermal radical initiator (like VAZO 52), allowing to reduce the amount of free radical initiator in the acrylic polymer in MEK. The differentiated temperature process in MEK allows to make the synthesis of the acrylic polymer at a temperature of 60° C., followed by an increase in temperature to reflux at 80° C. This temperature increase allows to destroy most of the remaining radical initiator due to its very low half-time of decomposition at this higher temperature. Alternatively, it is possible to make the reaction of the acrylic polymer at reflux using a parallel addition of the monomers and the initiator and still benefit from the possibility to destroy the remaining radical initiator at that higher temperature The examples below are following the Example 1. The acrylic polymer is cooked at reflux (80° C.) until no more free VAZO 52 can be detected by chromatography (HPLC). Then, increasing amounts of VAZO 52 up to 500 ppm (based on the solid acrylic polymer) are added (again) to the polymer solution prior to the grafting by the adduct, to show the advantage of being to lower the amount of remaining radical initiator. The grafting process is followed in order to detect any problem of gellification. When no gellification is observed, the grafted polymer solution is neutralized and dispersed in water following the described process and the dispersion characteristics are recorded. The results are shown in Table 11 below.

The above shows the advantage of being able to reduce the residual quantity of radical initiator. Quantities of e.g. free VAZO 52 between 0 to about 50 ppm appear to have no impact on the stability of the reaction medium: the resulting polymer dispersions are conform and show a colloidal stability superior to 10 days at 60° C. Above this amount there can be negative impact of remaining initiator. Quantities of free VAZO 52 between e.g. 125 to 500 ppm can lead to a gellification of the reaction medium in similar conditions; the gel appears more rapidly with the highest quantity of free VAZO 52.

The invention claimed is:

1. A radiation curable aqueous composition comprising at least one ethylenically unsaturated polymer (1) which is the reaction product of a water-dispersible (meth)acrylic polymer A containing pendant hydroxyl or isocyanate groups, and containing pendant groups capable of rendering the polymer dispersible in aqueous medium either directly or after reaction with a neutralizing agent;

at least one ethylenically unsaturated compound B which can be radically polymerized under irradiation and which attaches to the (meth)acrylic polymer A by an urethane linkage, wherein, if the (meth)acrylic polymer A contains pendant hydroxyl groups, the ethylenically unsaturated compound B is a compound B1 that is the reaction product of at least one polyisocyanate (b1) and of at least one ethylenically unsaturated compound (b2) containing one functional group capable of reacting with isocyanate groups, wherein compound (b2) is selected from polyethylenically unsaturated compounds (b21), used alone or in combination with one or more monoethylenically unsaturated compounds (b22), and wherein, if the (meth)acrylic polymer A contains pendant isocyanate groups, the ethylenically unsaturated compound B is a compound B2 that is an ethylenically unsaturated compound (b2) containing one functional group capable of reacting with isocyanate groups, wherein compound (b2) is selected from polyethylenically unsaturated compounds (b21), used alone or in combination with one or more monoethylenically unsaturated compounds (b22); and optionally, at least one neutralizing agent C, wherein the ethylenically unsaturated polymer (1) has residual hydroxyl functionality.

2. The composition of claim 1, wherein the (meth)acrylic polymer A contains pendant isocyanate groups, and wherein the weight ratio between polyethylenically unsaturated compounds (b21) and monoethylenically unsaturated compounds (b22) is from 1:0 to 1:1.

TABLE 11 viscosity of the grafted polymer solution and characteristics of the grafted polymer dispersion as a function of added VAZO 52 — according to the description of Example 1.

| EX. | VAZO 52 (ppm) | η polymer | Solids (%) | η (mPa · s) | pH | PS (nm) | Stability 60° C. (days) |
|---|---|---|---|---|---|---|---|
| 1g | 500 | gel (1h) | — | — | — | — | — |
| 1h | 125 | gel (6h) | — | — | — | — | — |
| 1i | 50 | low | 35 | 68 | 8.4 | 82 | >10 |
| 1j | 0 | low | 35 | 74 | 8.3 | 74 | >10 |

3. The composition of claim 1, wherein compound (b2) is a polyethylenically unsaturated compound.

4. The composition of claim 1, wherein compound (b2) is a mono-hydroxy poly(meth)acryloyl compound.

5. The composition of claim 1, wherein the (meth)acrylic polymer A is prepared from polymerizable monomers comprising
at least one (meth)acrylate (a1),
at least one ethylenically unsaturated monomer (a2) selected from a (meth)acrylate (a21) containing at least one hydroxyl functionality and/or from an ethylenically unsaturated monomer containing at least one isocyanate functionality (a22),
at least one ethylenically unsaturated monomer (a3) containing at least one acidic group and/or a salt thereof capable of rendering the polymer dispersible in aqueous medium,
optionally, at least one other ethylenically unsaturated monomer (a4) different from (a1) to (a3) and,
optionally, at least one other ethyelenically unsaturated monomer (a5) different from (a1) to (a4) and having a functional side chain capable to provide additional features to the polymer.

6. The composition of claim 1 comprising at least one further polyethylenically unsaturated compound (2) and/or at least one emulsifier (3).

7. The composition of claim 6, wherein the polyethylenically unsaturated compound (2) is selected from the group consisting of polyester (meth)acrylates, urethane (meth)acrylates, epoxy (meth)acrylates, polyether (meth)acrylates amino (meth)acrylates, and mixtures thereof.

8. The composition of claim 6, wherein the emulsifier (3) is selected from the group consisting of anionic surfactants, nonionic surfactants, and mixtures thereof.

9. The composition of claim 1, wherein the ethylenically unsaturated compound B1 is the reaction product of compounds (b1) and (b2) used in an equivalent ratio of isocyanate to hydroxyl from 1:0.5 to 1:0.75.

10. A coating, an adhesive, an ink or an overprint varnish comprising the composition of claim 1.

11. An article coated with the composition of claim 1.

12. A method of coating an article, comprising:
applying the composition of claim 1 to at least one surface of the article in the form of a wet film,
drying or flushing off at least a part of the water comprised in the film, and
curing the film by exposure to high energy radiation.

13. A method of making a coating, an adhesive, an ink or an overprint varnish comprising adding the composition of claim 1 to a coating, an adhesive, an ink or an overprint varnish.

* * * * *